(12) United States Patent
Chan et al.

(10) Patent No.: US 9,823,801 B2
(45) Date of Patent: Nov. 21, 2017

(54) TOUCH PANEL AND REPAIRING METHOD THEREOF

(71) Applicant: Au Optronics Corporation, Hsinchu (TW)

(72) Inventors: Lih-Hsiung Chan, Kaohsiung (TW); Shine-Kai Tseng, Taoyuan (TW); Chin-Yueh Liao, Taipei (TW); Hung-Wen Chou, Taoyuan (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 15/250,942

(22) Filed: Aug. 30, 2016

(65) Prior Publication Data

US 2016/0370900 A1 Dec. 22, 2016

Related U.S. Application Data

(63) Continuation of application No. 12/970,969, filed on Dec. 17, 2010, now abandoned.

(30) Foreign Application Priority Data

Oct. 4, 2010 (TW) .................... 99133743 A

(51) Int. Cl.
  *G06F 3/044* (2006.01)
  *G06F 3/047* (2006.01)

(52) U.S. Cl.
  CPC .............. *G06F 3/044* (2013.01); *G06F 3/047* (2013.01); *G06F 2203/04103* (2013.01); *G06F 2203/04111* (2013.01); *G06F 2203/04112* (2013.01); *Y10T 29/49117* (2015.01)

(58) Field of Classification Search
  CPC . G06F 2203/04103; G06F 2203/04111; G06F 2203/04112; G06F 3/044; G06F 3/047; Y10T 29/49117
  See application file for complete search history.

(56) References Cited

U.S. PATENT DOCUMENTS 7,187,423 B2 * 3/2007 Ozaki ............... G02F 1/136259
  345/104
8,199,120 B2 * 6/2012 Wu ....................... G06F 3/0418
  345/173

(Continued)

*Primary Examiner* — Afroza Chowdhury
(74) *Attorney, Agent, or Firm* — JCIPRNET

(57) ABSTRACT

A touch panel including a substrate, a plurality of first and second sensing series, and a plurality of conductive repairing pattern layers is provided. The first sensing series are disposed on the substrate and extended along a first direction. Each of the first sensing series includes a plurality of first sensing pads and first bridge lines, and the first bridge lines serially connect two adjacent first sensing pads. The second sensing series are disposed on the substrate and extended along a second direction. Each of the second sensing series includes a plurality of second sensing pads and second bridge lines, and the second bridge lines serially connect two adjacent second sensing pads. Each conductive repairing pattern layer electrically floating locates around the crossover region of the first and second sensing series. Two adjacent sensing pads are connected by the conductive repairing pattern layer after a repair procedure is finished.

20 Claims, 24 Drawing Sheets

(56) References Cited

U.S. PATENT DOCUMENTS

2009/0213090 A1* 8/2009 Mamba .................. G06F 3/044
                                                            345/174
2011/0227858 A1* 9/2011 An ......................... G06F 3/044
                                                            345/174

* cited by examiner

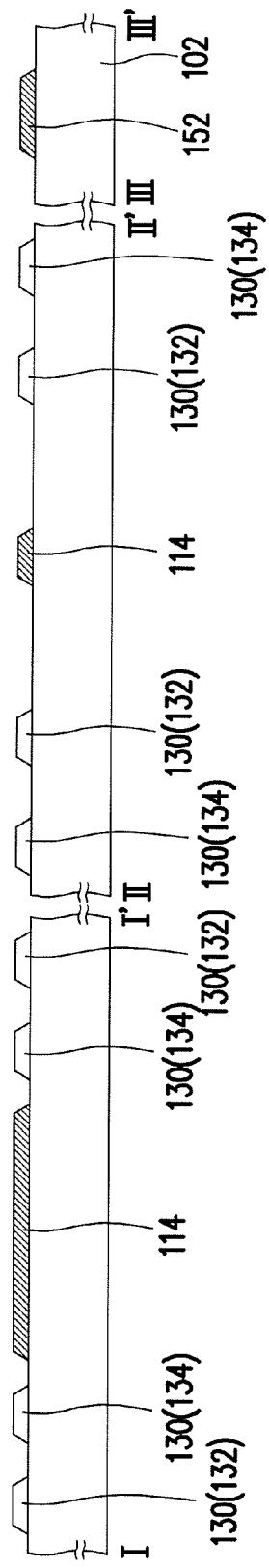
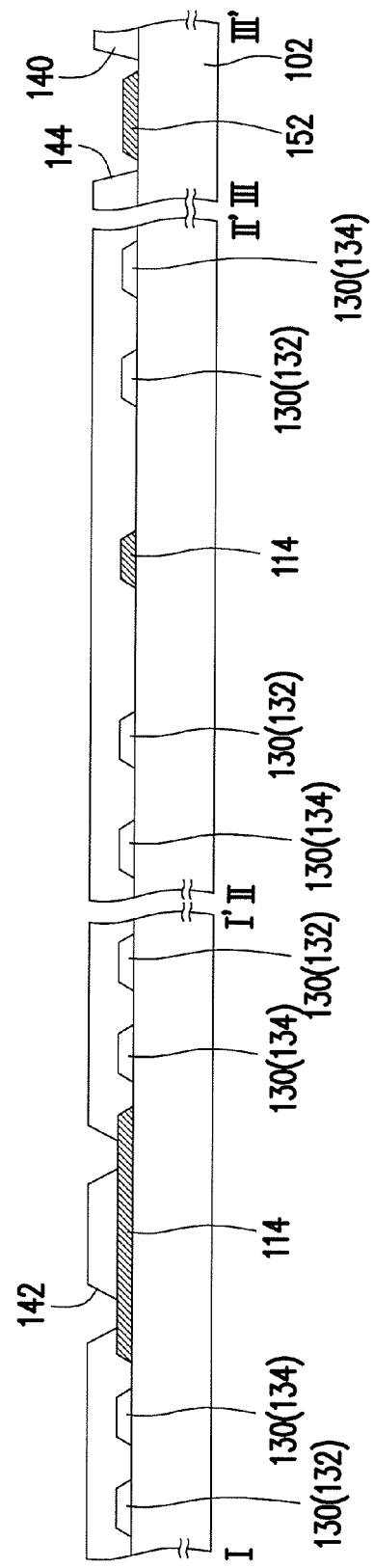
FIG. 3A
FIG. 3B

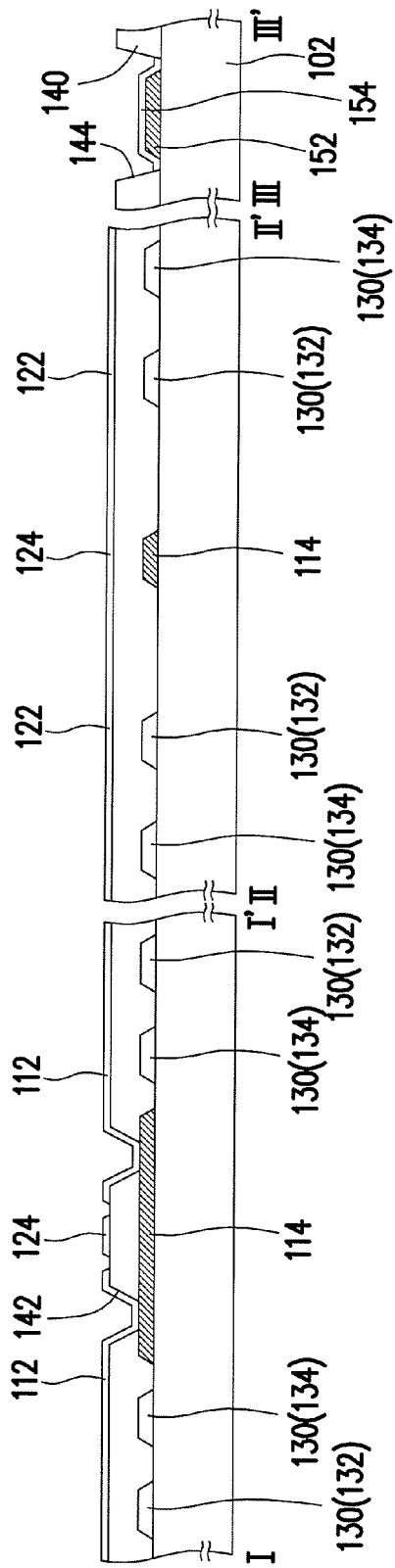
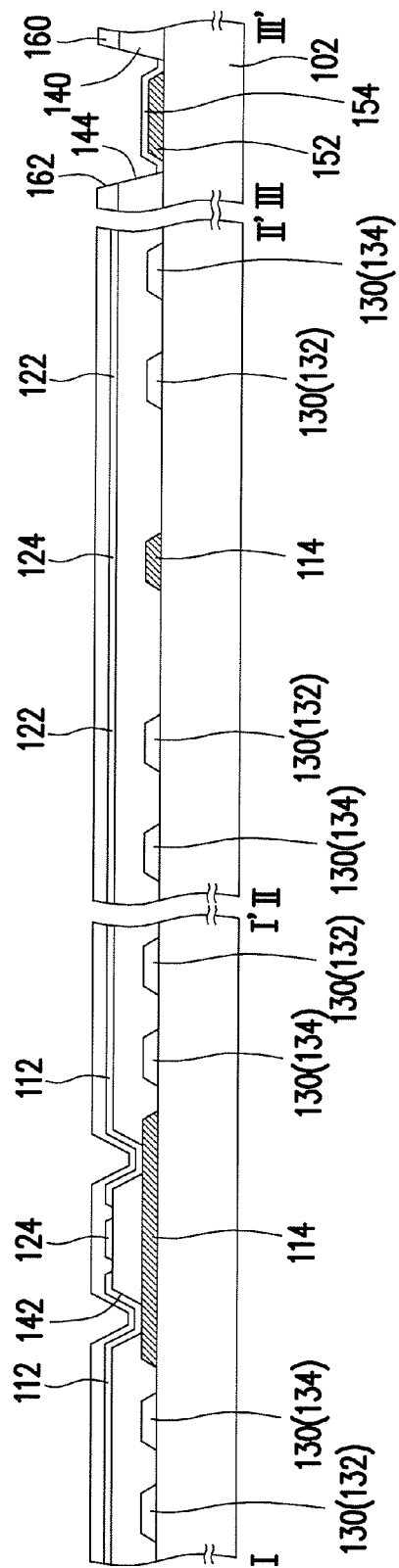
FIG. 3C
FIG. 3D

TOUCH PANEL AND REPAIRING METHOD THEREOF

CROSS-REFERENCE TO RELATED APPLICATION

This application is a continuation application of and claims the priority benefit of a prior application Ser. No. 12/970,969, filed on Dec. 17, 2010, now pending. The prior application Ser. No. 12/970,969 claims the priority benefit of Taiwan application serial no. 99133743, filed on Oct. 4, 2010. The entirety of each of the above-mentioned patent applications is hereby incorporated by reference herein and made a part of this specification.

BACKGROUND OF THE INVENTION

Field of the Invention

The invention relates to a panel and a repairing method thereof, and more particularly to a touch panel and a repairing method thereof.

Description of Related Art

Based on different ways of sensing, touch panels are generally categorized into resistant touch panels, capacitive touch panels, optical touch panels, sonic wave touch panels, and electromagnetic touch panels. The capacitive touch panels having advantages of fast response speed, favorable reliability, and durability have been used extensively in electronic devices. In view of structures and manufacturing methods, capacitive touch display panels can be further classified into an additive type and an integrated/in-cell type. In an additive-type capacitive touch display panel, sensing series are first formed on a substrate, and the substrate having the sensing series thereon is then adhered to an outer surface of a display panel. Consequently, the additive-type touch display panel inevitably has a certain thickness. Compared with the additive-type touch panel, an integrated/in-cell type touch display panel is more conducive to the slimness and lightness of the display.

However, in terms of fabrication, the integrated/in-cell type touch display panel and the additive-type touch display panel both encounter the problem of a low yield rate resulting from electrostatic discharge, and the above problem is especially serious in the integrated/in-cell type touch display panel. For instance, most of the current integrated/in-cell type touch display panels are fabricated by forming a touch-control circuit on one surface of the substrate and then forming a color filter thin film on the other surface of the substrate. While the color filter thin film is formed, the touch-control circuit is often damaged due to electrostatic discharge. Moreover, when an user touches the integrated/in-cell type touch display panel or the additive-type touch display panel with the fingers of the user, electrostatic discharge may also occur, resulting in the damage of the touch-control circuit.

Generally speaking, in the conventional capacitive touch panel, metal bridge lines configured on a crossover region, where an X sensing series intersect a Y sensing series, are used to couple the adjacent sensing pads to each other to avoid the short circuit happening on the X sensing series and the Y sensing series around the crossover region. For example, the two adjacent sensing pads of the X sensing series or the Y sensing series are electrically connected through a metal bridge line. However, when electrostatic discharge occurs, the metal bridge line in the crossover region of the X sensing series and the Y sensing series could be burned, causing a short defect or an open defect. As a result, the X sensing series or the Y sensing series will be unable to operate normally. Since electrostatic discharge is inevitable during fabrication and use, how to swiftly repair the sensing series when a short defect or an open defect occurs, is one of the important issues that all designers seek to overcome.

SUMMARY OF THE INVENTION

The invention provides a touch panel having a favorable yield.

The invention still further provides a repairing method of a touch panel. The method repairs the sensing series of the touch panel.

The invention provides a touch panel, including a substrate, a plurality of first sensing series, a plurality of second sensing series, and a plurality of conductive repairing pattern layers. The first sensing series are disposed on the substrate and extended along a first direction. Each of the first sensing series includes a plurality of first sensing pads and a plurality of first bridge lines. The first bridge lines serially connect two adjacent first sensing pads. The second sensing series are disposed on the substrate and extended along a second direction. Each of the second sensing series includes a plurality of second sensing pads and a plurality of second bridge lines. The second bridge lines serially connect two adjacent second sensing pads. The first direction is different from the second direction, and the first sensing series and the second sensing series are electrically insulated from each other. Each of the conductive repairing pattern layers is overlapped with two adjacent first sensing pads in the same first sensing series, and each conductive repairing pattern layer locates around the crossover region of the first sensing series and the second sensing series. The conductive repairing pattern layers are electrically floating, and can connect the two adjacent sensing pads after the repair procedure is finished.

An embodiment of the invention further comprises a first dielectric layer, disposed on the substrate to cover the conductive repairing pattern layers, wherein the first dielectric layer includes a plurality of contact windows. The first sensing pads and the second sensing pads are disposed on the first dielectric layer.

In an embodiment of the invention, the first dielectric layer further covers the first bridge lines. The first sensing pads connect to the first bridge lines through the contact windows, and the second bridge lines are disposed on the first dielectric layer.

In an embodiment of the invention, the first dielectric layer further covers the second bridge lines. The second sensing pads connect to the second bridge lines through the contact windows, and the first bridge lines are disposed on the first dielectric layer.

An embodiment of the invention further comprises a second dielectric layer disposed on the first dielectric layer, so as to cover the first sensing series and the second sensing series.

An embodiment of the invention further comprises a first dielectric layer, disposed on the substrate to cover the first sensing pads and the second sensing pads, wherein the first dielectric layer includes a plurality of contact windows. The conductive repairing pattern layers are disposed on the first dielectric layer.

In an embodiment of the invention, the first dielectric layer further covers the first bridge lines. The second bridge lines are disposed on the first dielectric layer. The second sensing pads connect to the second bridge lines through the contact windows.

In an embodiment of the invention, the first dielectric layer further covers the second bridge lines. The first bridge lines are disposed on the first dielectric layer. The first sensing pads connect to the first bridge lines through the contact windows.

In an embodiment of the invention, a material of the conductive repairing pattern layers is a transparent conductive material.

In an embodiment of the invention, a material of the conductive repairing pattern layers is a metallic conductive material.

In an embodiment of the invention, the first bridge lines and the conductive repairing pattern layers are made up of the same layer.

In an embodiment of the invention, the second bridge lines and the conductive repairing pattern layers are made up of the same layer.

In an embodiment of the invention, a material of the first sensing pads, a material of the first bridge lines and a material of the second sensing pads are the same.

In an embodiment of the invention, the conductive repairing pattern layer comprises a mesh repairing pattern layer. The mesh repairing pattern layer is overlapped with the corresponding two adjacent first sensing pads, and is overlapped with the corresponding two adjacent second sensing pads.

In an embodiment of the invention, the conductive repairing pattern layer comprises a plurality of first repairing lines electrically connected, and each of the first repairing lines is overlapped with the corresponding two adjacent first sensing pads.

In an embodiment of the invention, the conductive repairing pattern layer is further overlapped with two adjacent second sensing pads in the same second sensing series.

In an embodiment of the invention, each of the conductive repairing pattern layers comprises a plurality of first repairing lines electrically connected and a plurality of second repairing lines electrically connected. Each of the first repairing lines is overlapped with the corresponding two adjacent first sensing pads, and each of the second repairing lines is overlapped with the corresponding two adjacent second sensing pads.

An embodiment of the invention further comprises a plurality of dummy electrodes, disposed between the first sensing pads and the second sensing pads.

An embodiment of the invention further comprises a plurality of peripheral connecting lines, electrically connected to each corresponding first sensing series and each corresponding second sensing series respectively.

The invention further provides a repairing method for repairing a touch panel. The repairing method is suitable to repair the previously mentioned touch panel when a short defect or an open defect occurs in a crossover region of a first bridge line and a second bridge line of the touch panel. The first bridge line with the defect is cut, therefore two adjacent first sensing pads originally connected through the first bridge line are electrically insulated. The two adjacent first sensing pads electrically insulated are then electrically connected through a conductive repairing pattern layer overlapped with the two adjacent first sensing pads.

In an embodiment of the invention, a method of cutting the first bridge line with the defect includes a laser cutting process.

In an embodiment of the invention, the method of electrically connecting the two adjacent first sensing pads electrically insulated through the conductive repairing pattern layer overlapped with the two adjacent first sensing pads includes welding the conductive repairing pattern layer with the two adjacent first sensing pads.

In an embodiment of the invention, the method of welding includes a laser welding process.

The invention further provides a touch panel, including a substrate, a plurality of first bridge lines, a plurality of conductive repairing pattern layers, a first dielectric layer, a plurality of first sensing pads, and a plurality of second sensing series. The first bridge lines are disposed on the substrate, and extended along a first direction. The conductive repairing pattern layers are disposed on the substrate, and the conductive repairing pattern layers are electrically floating. The first dielectric layer is disposed on the substrate to cover the conductive repairing pattern layers and the first bridge lines. The first dielectric layer includes a plurality of contact windows, and each of the first bridge lines corresponds to two or more contact windows. The first sensing pads are disposed on the first dielectric layer. The first bridge lines serially connect the two adjacent first sensing pads through the contact windows, wherein the first sensing pads and the first bridge lines forms a plurality of first sensing series arranged in parallel. The second sensing series are arranged in parallel and disposed on the dielectric layer, extended along a second direction. Each of the second sensing series includes a plurality of second sensing pads and a plurality of second bridge lines. The second bridge lines serially connect two adjacent second sensing pads, and the first direction is different from the second direction, wherein the first sensing series and the second sensing series are electrically insulated from each other. Each of the conductive repairing pattern layers is overlapped with the corresponding two adjacent first sensing pads, and is overlapped with the corresponding two adjacent second sensing pads.

The invention further provides a touch panel, including a substrate, a plurality of first sensing pads, a plurality of second sensing series, a first dielectric layer, a plurality of first bridge lines, and a plurality of conductive repairing pattern layers. The first sensing pads are disposed on the substrate and extended along a first direction. The second sensing series are arranged in parallel and disposed on the substrate, extended along a second direction. Each of the second sensing series includes a plurality of second sensing pads and a plurality of second bridge lines. The second bridge lines serially connect two adjacent second sensing pads. The first direction is different from the second direction, wherein the first sensing pads and the second sensing series are electrically insulated from each other. The first dielectric layer is disposed on the substrate to cover the first sensing pads and the second sensing series. The first dielectric layer includes a plurality of contact windows, and each of the first sensing pads corresponds to two or more contact windows. The first bridge lines are disposed on the first dielectric layer along a first direction. The first bridge lines serially connect the two adjacent first sensing pads through the contact windows, forming a plurality of first sensing series arranged in parallel. The conductive repairing patterns are disposed on the first dielectric layer, and the conductive repairing patterns are electrically floating. Each of the conductive repairing pattern layers is overlapped with the corresponding two adjacent first sensing pads, and is overlapped with the corresponding two adjacent second sensing pads.

Based on the above, in the touch panel and repairing method of the invention, each of the conductive repairing pattern layers is overlapped with two adjacent sensing pads in the same sensing series. As such, when the crossover region of the two sensing series has a short defect or an open defect, the conductive repairing pattern layers can be used to repair the defects, so the two sensing series can provide a normal sensing operation. As a result, the touch panel has a favorable yield and simple repair method.

In order to make the aforementioned and other features and advantages of the invention more comprehensible, several embodiments accompanied with figures are described in detail below.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

FIG. 3A to FIG. 3D are respectively schematic cross-sectional views taken along a line I-I', a line and a line in FIG. 2A to FIG. 2D.

DESCRIPTION OF EMBODIMENTS

The First Embodiment

Figure 1A:
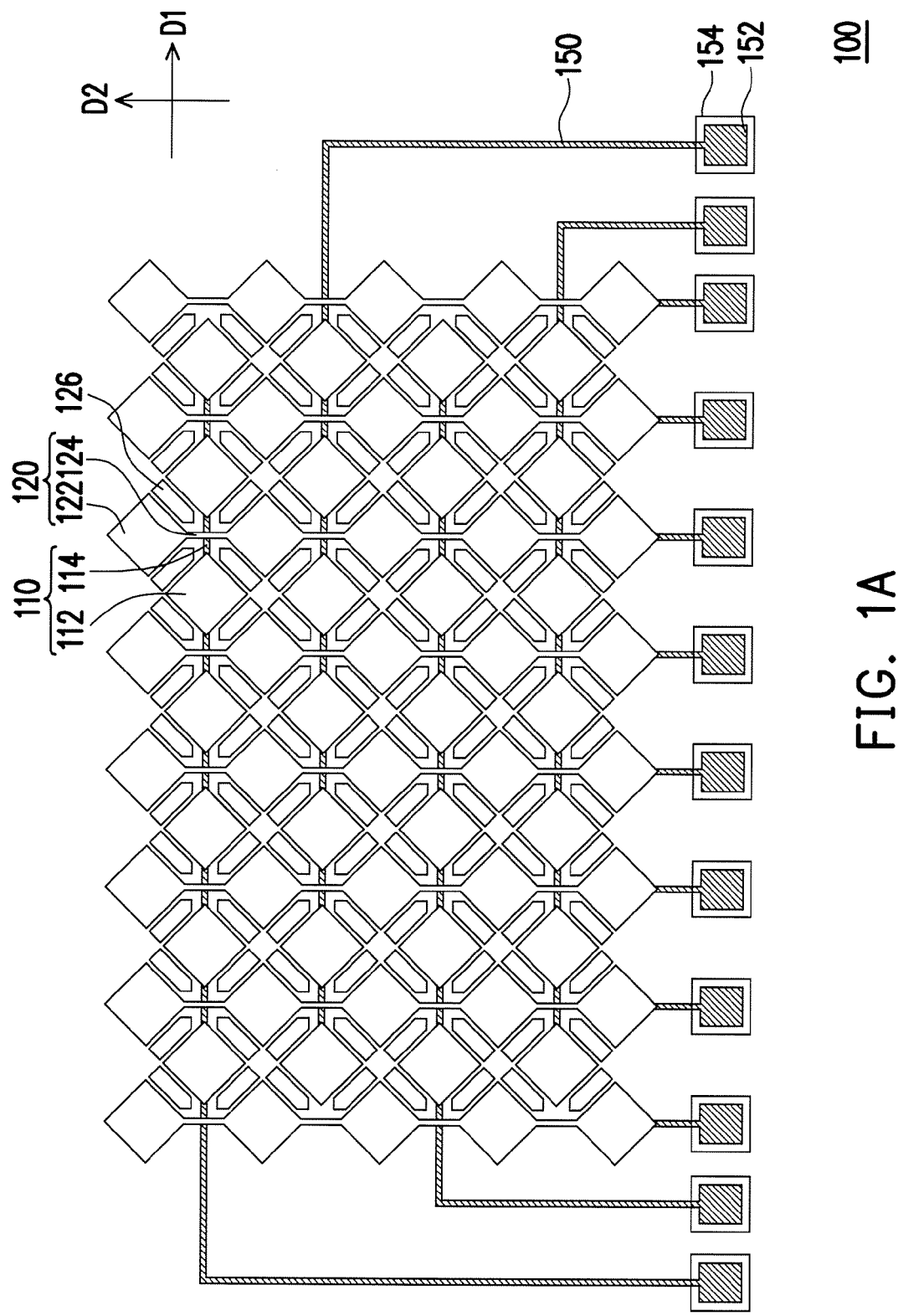
FIG. 1A is a schematic top view of a touch panel according to a first embodiment of the invention.
Figure 1B:
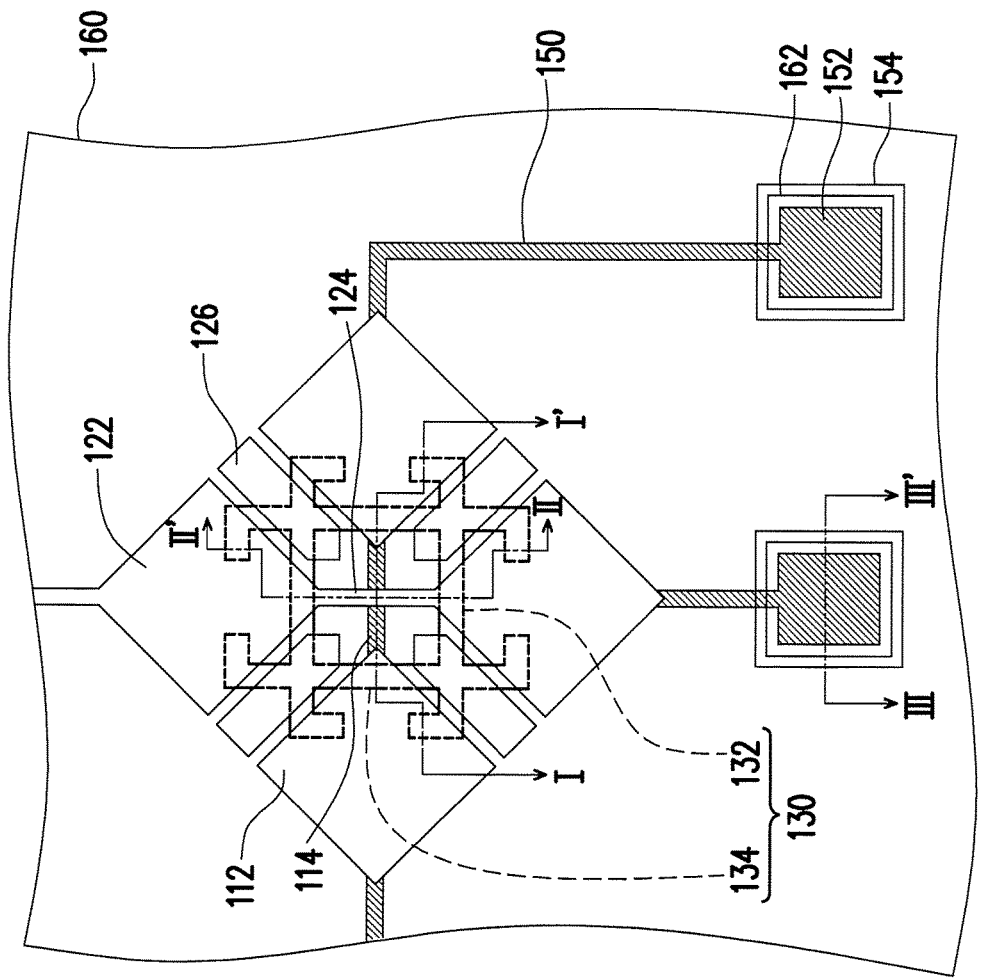
FIG. 1B is a partially enlarged schematic diagram of FIG. 1A.
Figure 1C:
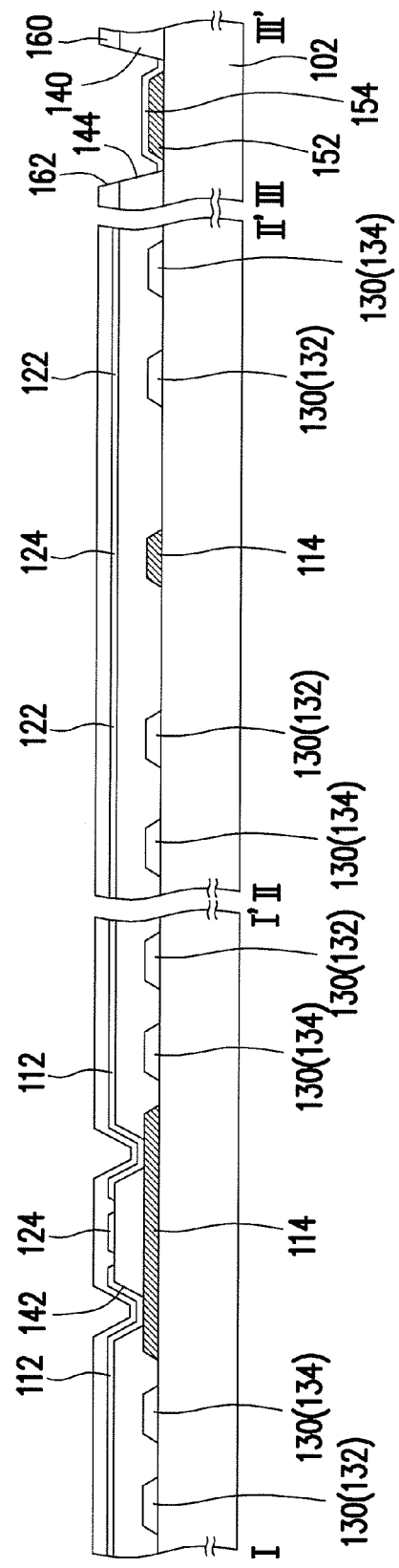
FIG. 1C is schematic cross-sectional views taken along a line I-I', a line and a line III-III' in FIG. 1B.

FIG. 1A is a schematic top view of a touch panel according to a first embodiment of the invention. FIG. 1B is a partially enlarged schematic diagram of FIG. 1A. FIG. 1C is schematic cross-sectional views taken along a line I-I', a line II-II', and a line III-III' in FIG. 1B. Referring to FIG. 1A to FIG. 1C, in the embodiment, the touch panel 100 includes a substrate 102, a plurality of first sensing series 110, a plurality of the second sensing series 120, a plurality of conductive repairing pattern layers 130, and a first dielectric layer 140. The substrate 102 is, for example, a glass substrate, a plastic substrate, a flexible substrate, or other substrates. The substrate 102 can also be a printed circuit board or a display panel, such as a liquid crystal display panel, an organic display panel, an electrophoresis display panel, a plasma display panel, or other type display panels, and can directly assembly on the display panel or in the display panel. Taking a liquid crystal display panel as an example, the liquid crystal display panel can be manufactured as an additive touch liquid crystal display panel, an integrated type touch liquid crystal display panel, or an in-cell type touch liquid crystal display panel. The above details are well-known to persons skilled in the art, and so no further descriptions are provided herein. In the embodiment, the first dielectric layer 140 is, for example, disposed on the substrate 102 to cover the conductive repairing pattern layers 130, wherein the first dielectric layer 140 has a plurality of contact windows 142. The contact windows 142 can be dielectric through holes, dielectric openings, or dielectric vias, exposing part of the conductive repairing pattern layers 130.

The first sensing series 110 are disposed on the substrate 102 and extended along a first direction D1. The first sensing series 110 includes a plurality of first sensing pads 112 and a plurality of first bridge lines 114. The first bridge lines 114 serially connect two adjacent first sensing pads 112. In the embodiment, the first sensing series 110 are, for example, disposed parallel to each other. The first direction D1 is, for example, an x-axis direction. The first bridge lines 114 are, for example, disposed on the substrate 102 and covered by the first dielectric layer 140, wherein the first bridge lines 114 correspond to two contact windows 142. The first sensing pads 112 are, for example, disposed on the first dielectric layer 140, wherein the first bridge lines 114, for example, serially connect two adjacent first sensing pads 112 through the contact windows 142. A material of the first sensing pads 112 is, for example, a transparent conductive material, including indium tin oxide (ITO), indium zinc oxide (IZO), or other transparent conductive metallic oxides. A material of the first bridge lines 114 is, for example, a metallic conductive material, including aluminum, copper, molybdenum, titanium, silver, gold, platinum and other alloys or metals.

The second sensing series 120 are disposed on the substrate 102 and extended along a second direction D2. Each of the second sensing series 120 includes a plurality of second sensing pads 122 and a plurality of second bridge lines 124. The second bridge lines 124 serially connect two adjacent second sensing pads 122. The first direction D1 is different from the second direction D2. In the embodiment, the second sensing series 120 are, for example, disposed parallel to each other. The second direction D2 is, for example, a y-axis direction, wherein the first direction D1 is, for example, perpendicular to the second direction D2. The second sensing pads 122 and the second bridge lines 124 are, for example, disposed on the first dielectric layer 140. In the embodiment, the second sensing pad 122 and the second bridge line 124 are, for example, made up of the same conductive layer, wherein the material is, for example, a transparent conductive material, including indium tin oxide (ITO), indium zinc oxide (IZO), or other transparent conductive metallic oxides. In an alternative embodiment, the first sensing pads 112 and the second sensing pads 122 can be also formed by a mesh metallic material. The above details are well-known to persons skilled in the art, and so no further descriptions are provided herein.

In the embodiment, the touch panel 100 further comprises a plurality of dummy electrodes 126, disposed between the first sensing pads 112 and the second sensing pads 122. A material of the dummy electrodes 126 is, for example, a transparent conductive material or a mesh metallic material.

The first sensing series 110 and the second sensing series 120 are electrically insulated from each other. In detail, in the embodiment, a crossover region of the first sensing series 110 and the second sensing series 120 is, for example, at the first bridge lines 114 and the second bridge lines 124. The first dielectric layer 140 is disposed between the first bridge lines 114 and the second bridge lines 124. Thus, the first sensing series 110 and the second sensing series 120 are electrically insulated from each other.

Please simultaneously refer to FIG. 1B and FIG. 1C. The conductive repairing pattern layer 130 is overlapped with the two adjacent first sensing pads 112 disposed in the same first sensing series 110, overlapped with the two adjacent second sensing pads 122 disposed in the same second sensing series 120, or overlapped with both of the above, and the conductive repairing pattern layers 130 are electrically floating. In the embodiment, the conductive repairing pattern layers 130 are, for example, disposed on the substrate 102 and covered by the first dielectric layer 140.

In the embodiment, the conductive repairing pattern layer 130 is, for example, overlapped with two adjacent first sensing pads 112 in the same first sensing series 110, and is overlapped with two adjacent second sensing pads 122 in the same second sensing series 120. In other words, the conductive repairing pattern layer 130 is, for example, simultaneously overlapped with two adjacent first sensing pads 112 and two adjacent second sensing pads 122. For example, as shown in FIG. 1B, the conductive repairing pattern layer 130 is disposed around the crossover region of the first sensing series 110 and the second sensing series 120, and accordingly around the crossover region of the first bridge line 114 and the second bridge line 124. The conductive repairing pattern layers 130, for example, include a plurality of first repairing lines 132 and a plurality of second repairing lines 134. The first repairing line 132 is overlapped with the corresponding two adjacent first sensing pads 112, and the second repairing line 134 is overlapped with the corresponding two adjacent second sensing pads 122. In the embodiment, the first repairing line 132 and the second repairing line 134 of the conductive repairing pattern layer 130 are, for example, substantially integrated as a whole, and made up of a mesh repairing pattern layer. In this case, the mesh repairing pattern layer is overlapped with the corresponding two adjacent first sensing pads 112, and is overlapped with the corresponding two adjacent second sensing pads 122. A material of the conductive repairing pattern layers 130 includes, for example, a transparent conductive material or a mesh metallic material. In the embodiment, a material of the conductive repairing pattern layers 130 is, for example, a transparent conductive material, and a material of the first bridge lines 114 includes, for example, a mesh metallic material. However, in other embodiments, the conductive repairing pattern layers 130 and the first bridge lines 114 are, for example, made up of the same layer. When the conductive repairing pattern layers 130 uses a metallic conductive material and is directly integrated in the display panel, the line width of the conductive repairing pattern layers 130 is preferably smaller than 20 micrometers, so as to avoid the conductive repairing pattern layers 130 being a visual structure.

It should be noted that although in the embodiment the conductive repairing pattern layer 130 is simultaneously overlapped with two adjacent first sensing pads 112 and two adjacent second sensing pads 122, and has a mesh structure, in an embodiment, the conductive repairing pattern layer 130 can also be overlapped with two adjacent first sensing pads 112 or two adjacent second sensing pads 122. For example, in an embodiment, the conductive repairing pattern layer 130 can comprise a first repairing line 132 or a plurality of first repairing lines 132, and the first repairing line 132 is overlapped with the corresponding two adjacent first sensing pads 112. In addition, even though the embodiment uses the conductive repairing pattern layer 130 shown in FIG. 1B, the conductive repairing pattern layer 130 can also have other structures; the invention is not limited thereto.

In the embodiment, the touch panel 100 further comprises a plurality of peripheral connecting lines 150 and a plurality of peripheral connecting pads 152. The peripheral connecting lines 150 respectively connect the first sensing series 110 and the second sensing series 120 to the corresponding peripheral connecting pad 152. A material of the peripheral connecting line 150 and the peripheral connecting pad 152 is, for example, a metallic conductive material, and the peripheral connecting pad 152 is further covered by a transparent conductive pattern 154. A material of the transparent conductive patterns 154 is, for example, a transparent conductive metallic oxide. In addition, in the embodiment, the touch panel 100 further includes a second dielectric layer 160 disposed on the first dielectric layer 140 to cover the first sensing series 110 and the second sensing series 120. The first dielectric layer 140 and the second dielectric layer 160 exposes the peripheral connecting pads 152 through the contact windows 144, 162.

Further provided is a manufacturing process of the touch panel of the invention, and FIG. 2A to FIG. 2D are schematic partial top views illustrating the manufacturing process of a touch panel in FIG. 1A. FIG. 3A to FIG. 3D are respectively schematic cross-sectional views taken along a line I-I', a line II-II', and a line III-III' in FIG. 2A to FIG. 2D. Please simultaneously refer to FIG. 2A and FIG. 3A. First, a plurality of first bridge lines 114, a plurality of conductive repairing pattern layers 130, a plurality of peripheral connecting lines 150, and a plurality of peripheral connecting pads 152 are formed on a substrate 102. In the embodiment, a material of the first bridge lines 114, the peripheral connecting lines 150, and the peripheral connecting pads 152 is, for example, a metallic conductive material, and a material of the conductive repairing pattern layers 130 is, for example, a transparent conductive material. Thus, the step, for example, includes the following. A metallic material layer (not shown) is formed on the substrate 102, and the metallic material layer is then patterned to form the plurality of first bridge lines 114, the plurality of peripheral connecting lines 150, and the plurality of peripheral connecting pads 152. A transparent conductive material layer (not shown) is formed on the substrate 102, and the transparent conductive material layer is then patterned to form the plurality of conductive repairing pattern layers 130. Alternatively, in an embodiment, the conductive repairing pattern layers 130 and the first bridge lines 114 can also be made up of the same layer, that is, all of them are formed from a metallic material layer. As such, the conductive repairing pattern layers 130, the first bridge lines 114, the peripheral connecting lines 150 and the peripheral connecting pads 152 can be formed in one patterning process, to simplify the manufacturing steps of the touch panel 100.

Figure 2A:
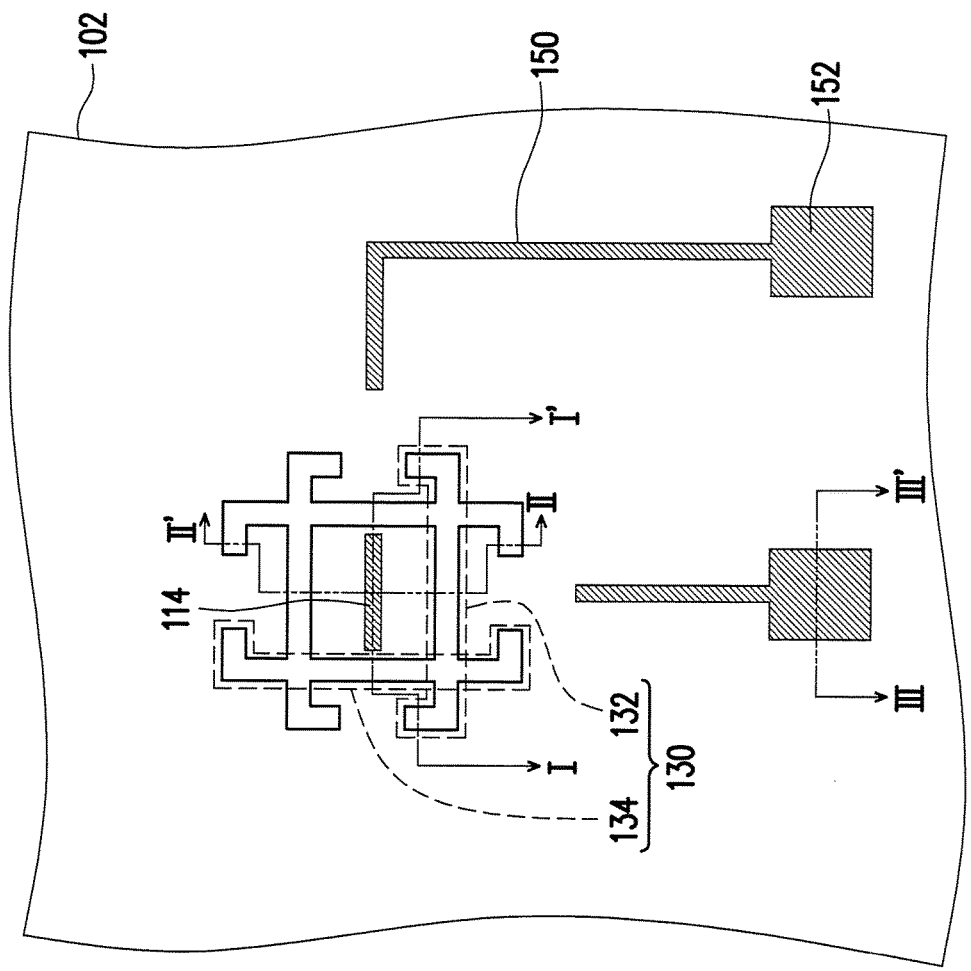
FIG. 2A to FIG. 2D are schematic top views illustrating the manufacturing process of a touch panel in FIG. 1A.
Figure 2B:
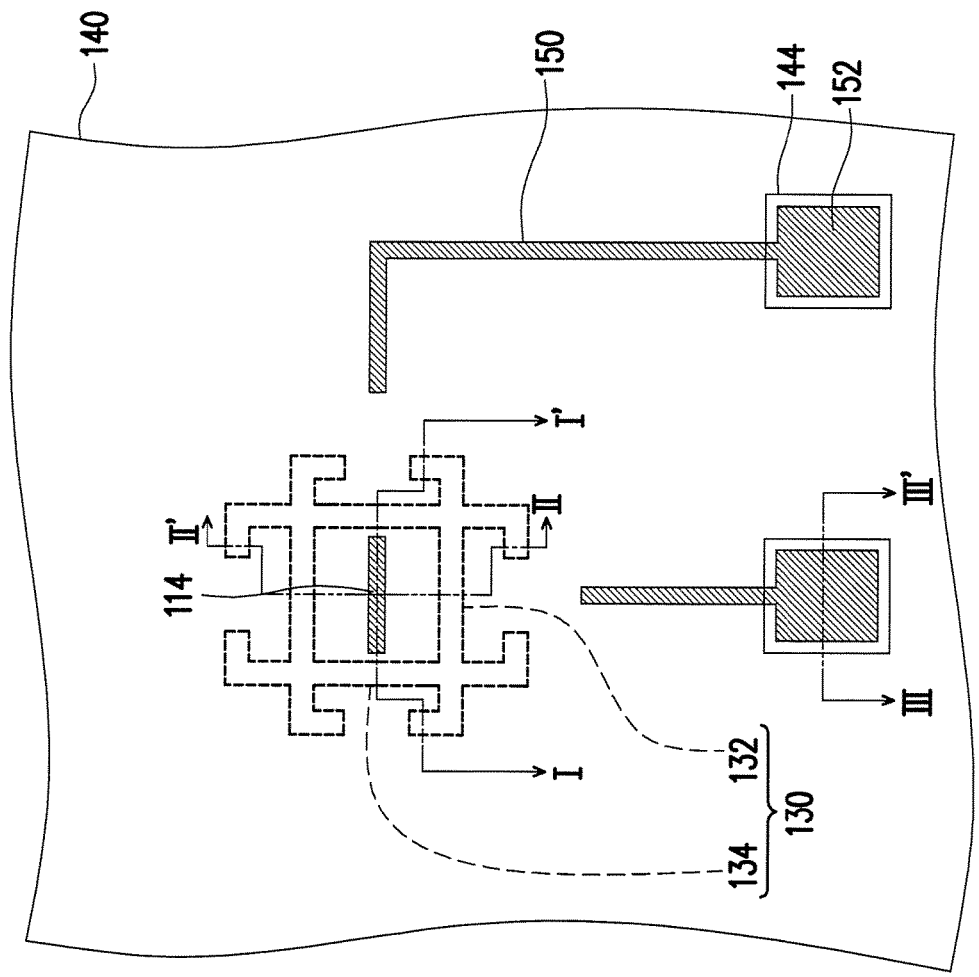

Please simultaneously refer to both FIG. 2B and FIG. 3B. Next, a first dielectric layer 140 is forming on the substrate 102 to cover the first bridge lines 114 and the conductive repairing pattern layers 130, wherein the first dielectric layer 140 has a plurality of contact windows 142. The first bridge line 114, for example, corresponds to two contact windows 142. In the embodiment, the first dielectric layer 140 further covers the peripheral connecting lines 150, and exposes the peripheral connecting pads 152 through the contact window 144.

Figure 2C:
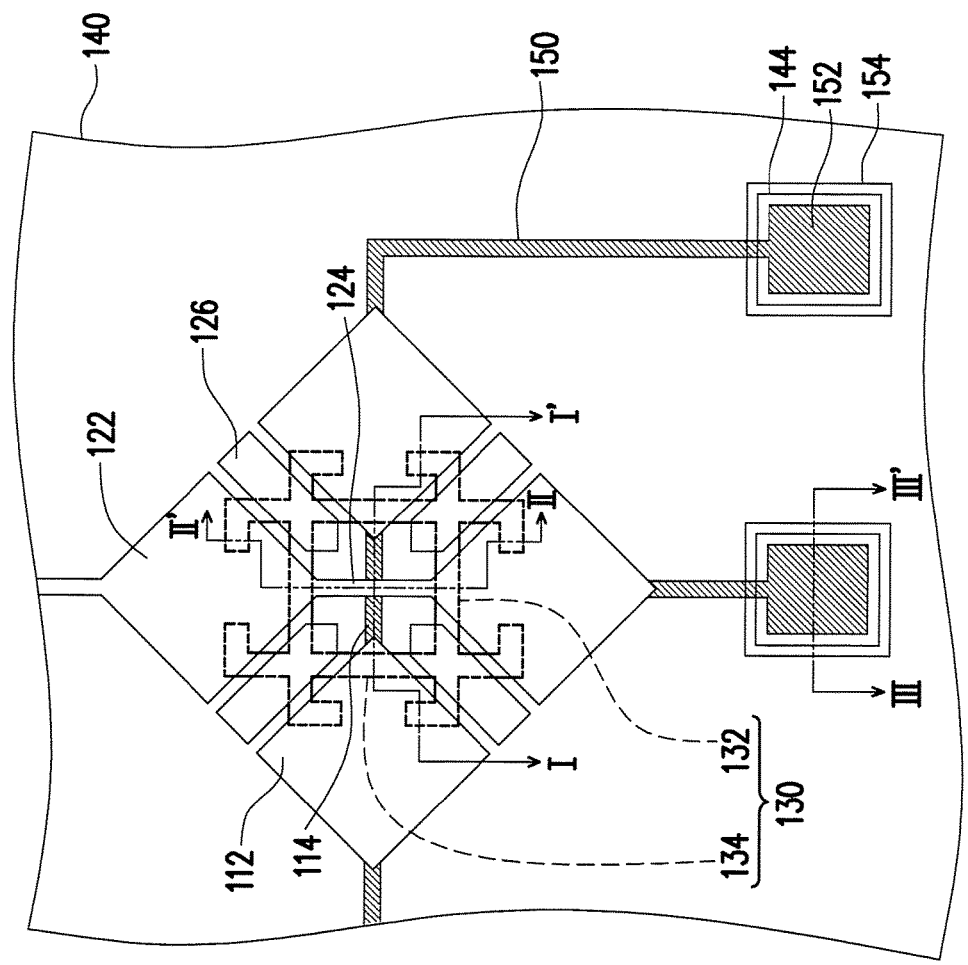

Please simultaneously refer to FIG. 2C and FIG. 3C. Next, a plurality of first sensing pads 112, a plurality of second sensing pads 122, a plurality of second bridge lines 124, and transparent conductive patterns 154 are formed on the first dielectric layer 140, wherein the first sensing pads 112 are formed in the contact windows 142 of the first dielectric layer 140 to contact the first bridge lines 114. In the embodiment, the step further comprises fouling a plurality of dummy electrodes 126 between the first sensing pads 112 and the second sensing pads 122. In detail, in the embodiment, the step includes the following, for example. A transparent conductive material layer (not shown) is formed on the first dielectric layer 140 and patterned, to simultaneously form the first sensing pads 112, the second sensing pads 122, the second bridge lines 124, the transparent conductive patterns 154, and the dummy electrodes 126. The first sensing pads 112 and the first bridge lines 114 electrically connected thereto form the first sensing series 110, and the second sensing pad 122 and the second bridge line 124 electrically connected thereto form the second sensing series 120. In the embodiment, the conductive repairing pattern layer 130 is, for example, simultaneously overlapped with two adjacent first sensing pads 112 and two adjacent second sensing pads 122.

Figure 2D:
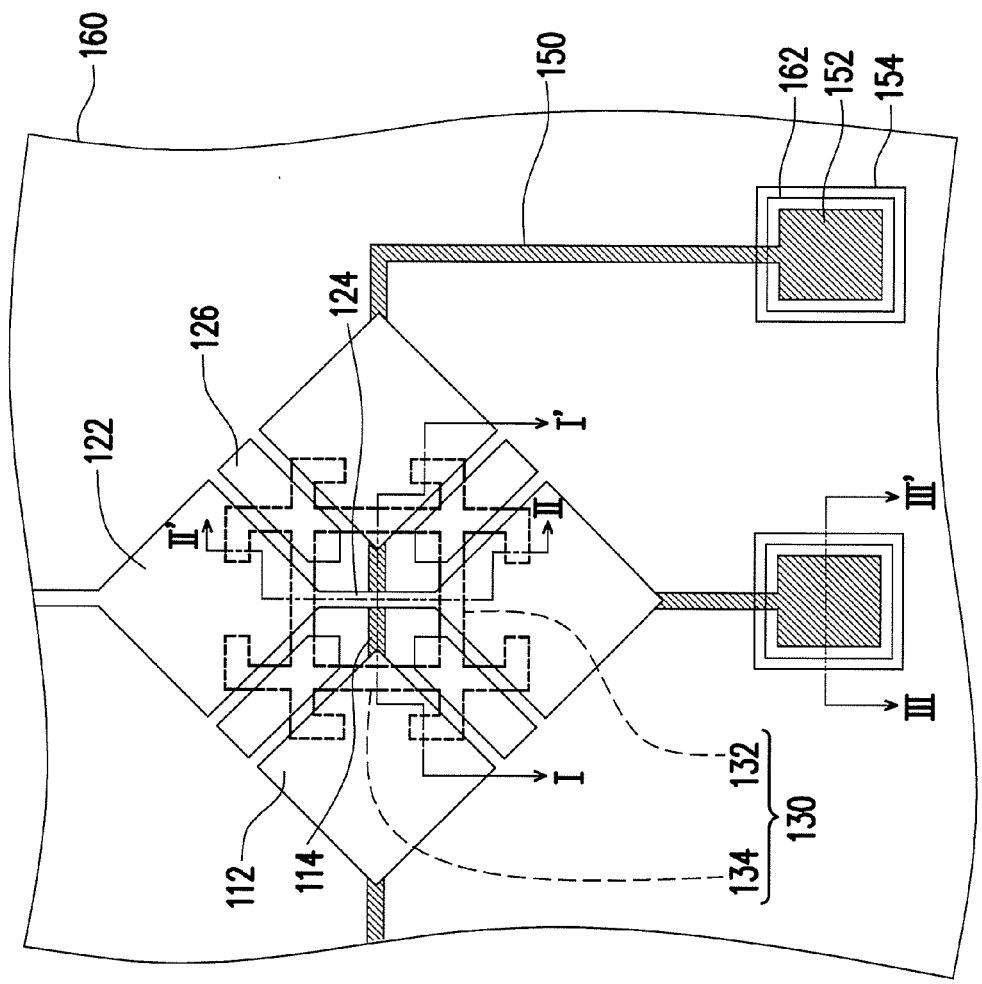

Please simultaneously refer to FIG. 2D and FIG. 3D. Subsequently, the second dielectric layer 160 is formed on the substrate 102, to cover the first sensing series 110 and the second sensing series 120, and the manufacture of the touch panel 100 is completed. In the embodiment, the second dielectric layer 160 exposes the transparent conductive patterns 154 on the peripheral connecting pads 152 through the contact windows 162.

Figure 4A:
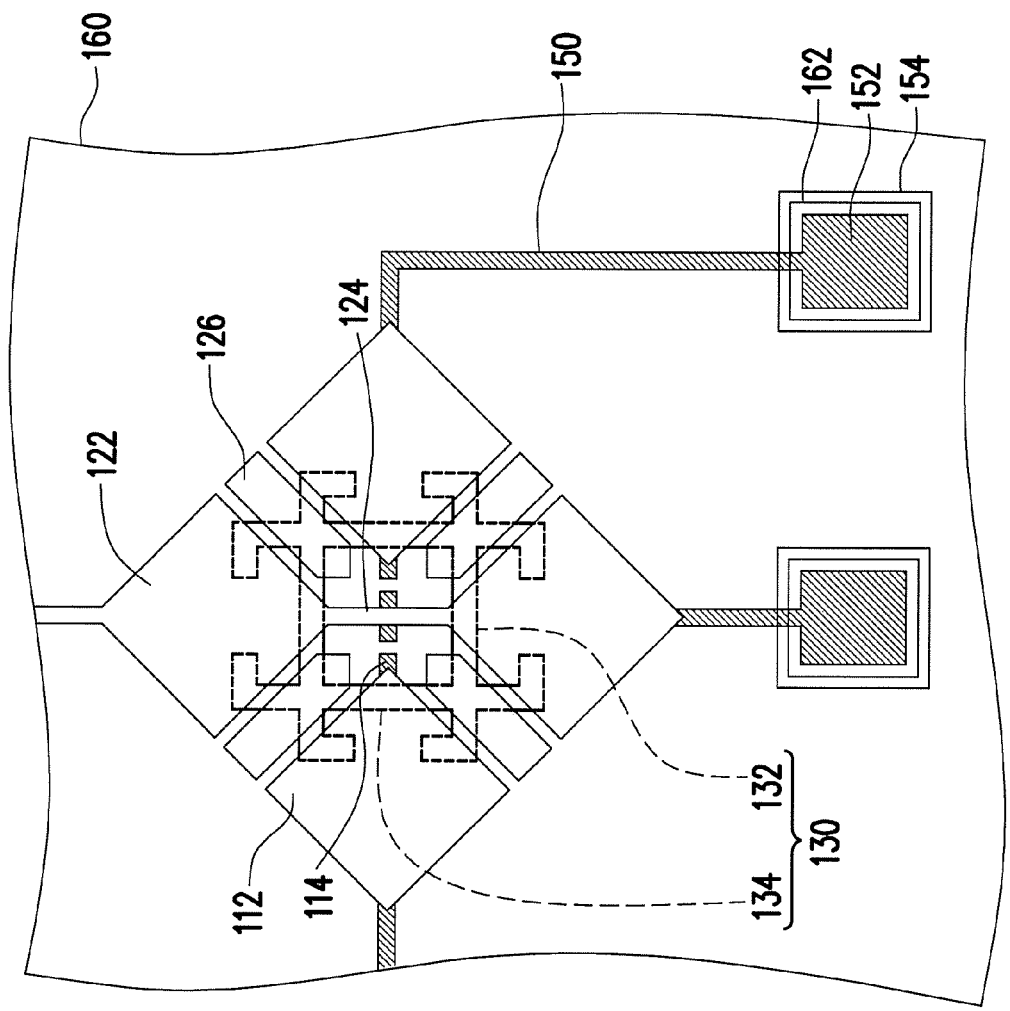
FIG. 4A and FIG. 4B depicts a repairing method of a touch panel according to an embodiment of the invention.
Figure 4B:
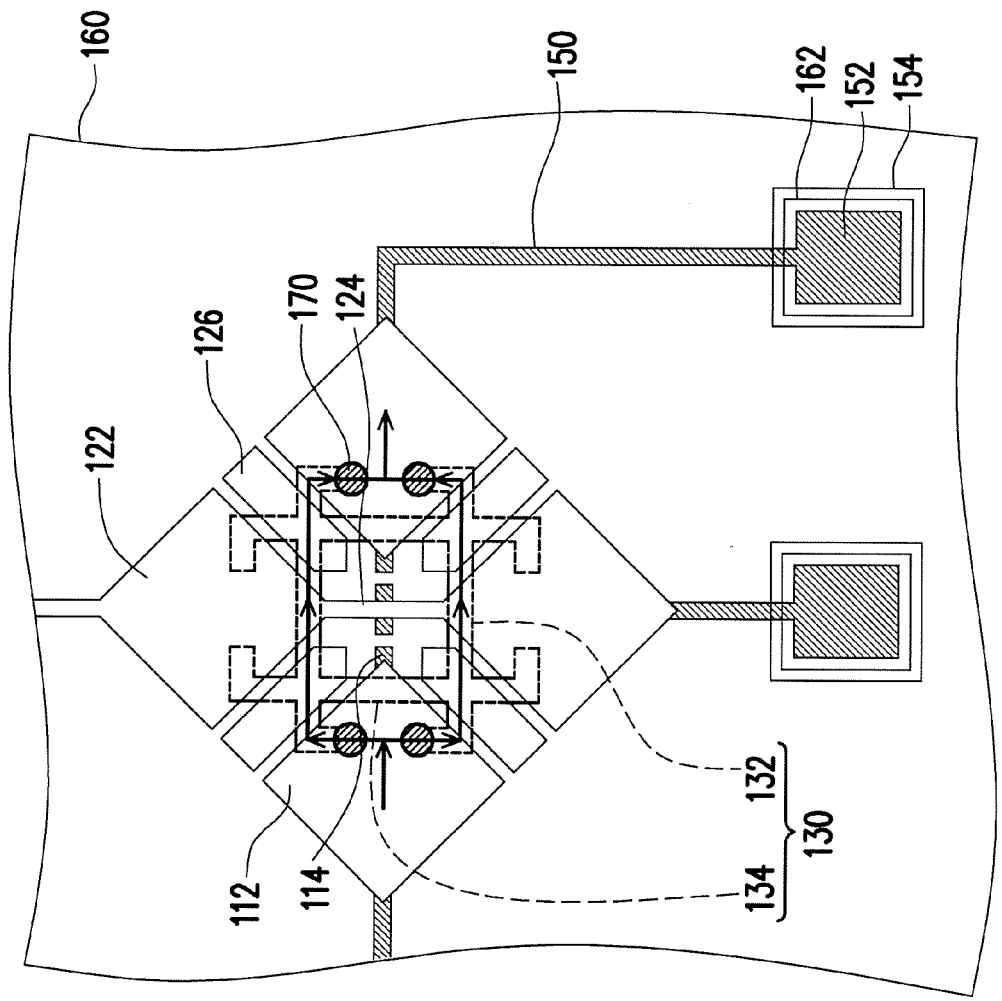

The invention provides a repairing method for repairing the aforementioned touch panel 100 when the crossover region of the first bridge line 114 of the first sensing series 110 and the second bridge line of the second sensing series 120 has a short defect or an open defect. FIG. 4A and FIG. 4B are schematic top views depicting a repairing method of the touch panel 100 in FIG. 1A when crossover region of the first bridge line 114 and the second bridge line 124 has a short defect or an open defect. Please refer to FIG. 4A. First, the first bridge line 114 with the defect is cut, therefore two adjacent first sensing pads 112 originally connected through the first bridge line 114 are electrically insulated. The method of cutting the first bridge line 114 with the defect is, for example, using a laser cutting process, and the method of cutting the first bridge line 114 is, for example, cutting the connecting part between the first bridge line 114 and the first sensing pad 112. As such, the two adjacent first sensing pads 112 are electrically insulated.

Please refer to FIG. 4B. Next, the two adjacent first sensing pads 112 electrically insulated are electrically connected through the conductive repairing pattern layer 130 overlapped with the two adjacent first sensing pads 112. In the embodiment, a laser welding method, for instance, is used to weld the conductive repairing pattern layer 130 and the two adjacent first sensing pads 112, so a welding point 170 is formed where the conductive repairing pattern layer 130 is overlapped with two adjacent first sensing pads 112. In detail, for instance, the first repairing line 132 of the conductive repairing pattern layer 130 is welded with the two adjacent first sensing pads 112, so that the welding point 170 is formed where the first repairing line 132 is overlapped with the two adjacent first sensing pads 112. As such, the two adjacent first sensing pads 112 use the electrical connection between the welding point 170 and the conductive repairing pattern layers 130, so that the two adjacent first sensing pads 112 use the path in FIG. 4B to connect electrically. Therefore, the first sensing series 110 can provide a normal sensing operation. In addition, since the first bridge line 114 with the defect is electrically insulated from the first sensing series 110 after repairing, thus the first sensing series 110 and the second sensing series 120 are again electrically insulated. Therefore, the first sensing series 110 and the second sensing series 120 can provide a normal sensing operation. In other words, the touch panel 100 can provide a normal sensing operation.

Figure 5A:
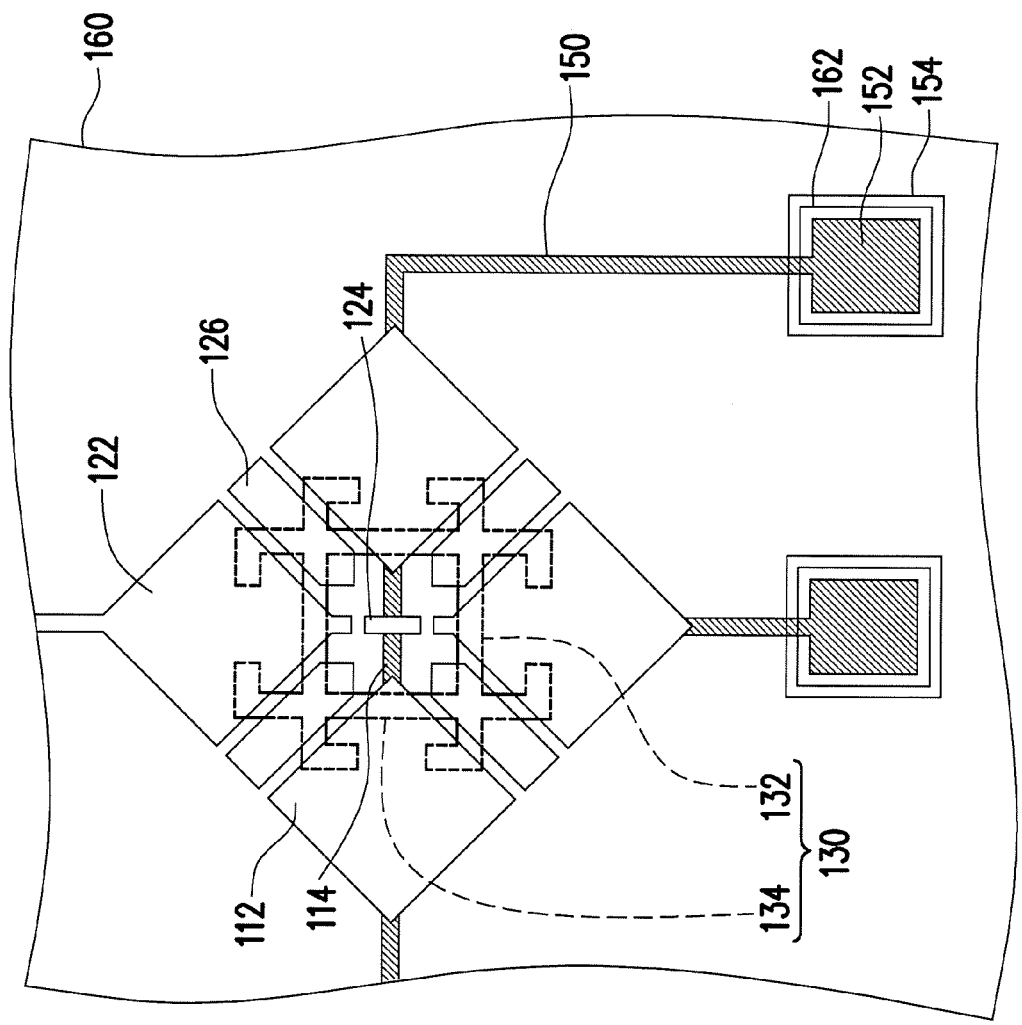
FIG. 5A and FIG. 5B depicts a repairing method of a touch panel according to an embodiment of the invention.
Figure 5B:
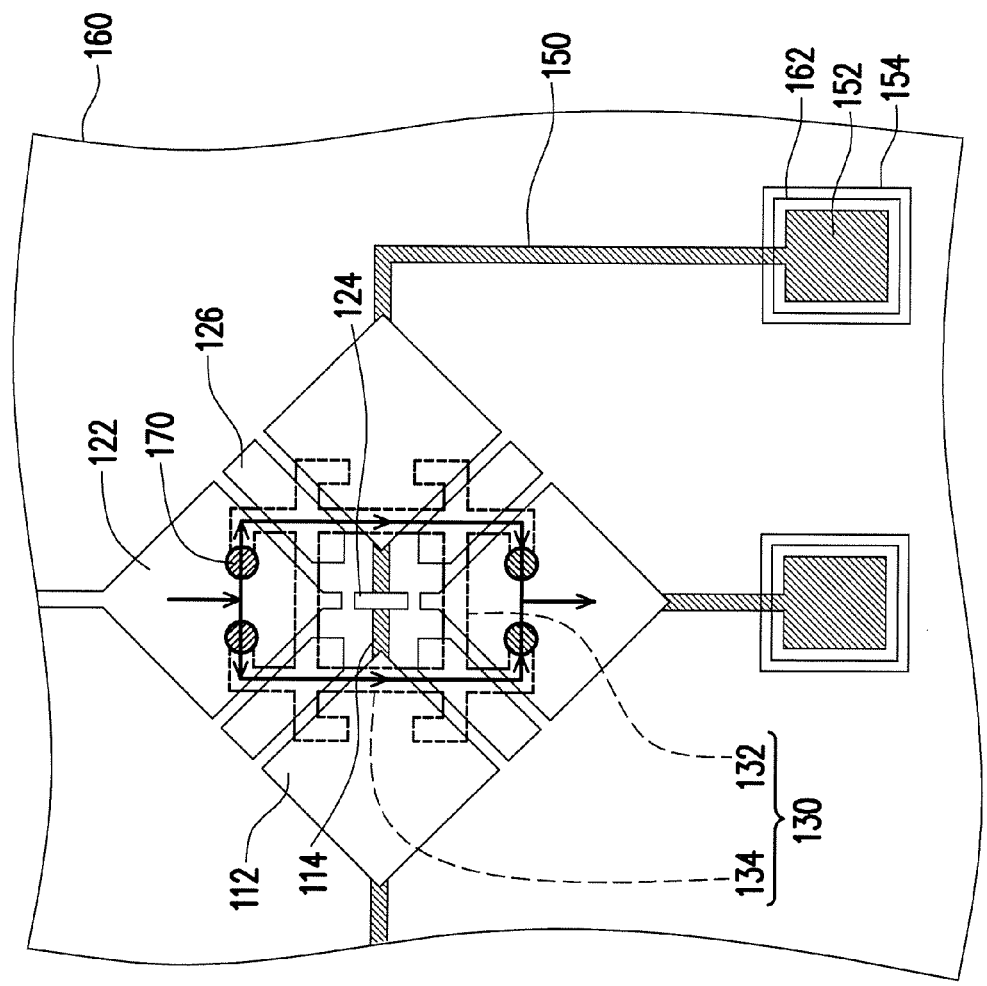

On the other hand, when the crossover region of the first bridge line 114 of the first sensing series 110 and the second bridge line 124 of the second sensing series 120 has a short defect or an open defect, the repairing method may also cut the second bridge line 124. FIG. 5A and FIG. 5B are schematic top views depicting a repairing method of the touch panel 100 in FIG. 1A when the crossover region of the first bridge line 114 and the second bridge line 124 has a short defect or an open defect. Please refer to FIG. 5A. In the embodiment, first, the second bridge line 124 with the defect is cut, therefore two adjacent second sensing pads 122 originally connected through the second bridge line 124 are electrically insulated. The method of cutting the second bridge line 124 with the defect is, for example, using a laser cutting process, and the method of cutting the second bridge line 124 is, for example, cutting the connecting part between the second bridge line 124 and the second sensing pad 122. As such, the two adjacent second sensing pads 122 are electrically insulated.

Please refer to FIG. 5B. Next, the two adjacent second sensing pads 122 electrically insulated are electrically connected through the conductive repairing pattern layer 130 overlapped with the two adjacent second sensing pads 122. In the embodiment, a laser welding method, for instance, is used to weld the conductive repairing pattern layer 130 and the two adjacent second sensing pads 122, so a welding point 170 is formed where the conductive repairing pattern layer 130 is overlapped with two adjacent second sensing pads 122. In detail, for instance, the second repairing line 134 of the conductive repairing pattern layer 130 is welded with the two adjacent second sensing pads 122, so that the welding point 170 is formed where the second repairing line 134 is overlapped with the two adjacent second sensing pads 122. As such, the two adjacent second sensing pads 122 use the electrical connection between the welding point 170 and the conductive repairing pattern layers 130, so that the two adjacent second sensing pads 122 use the path in FIG. 5B to connect electrically. Therefore, the second sensing series 120 can provide a normal sensing operation. In addition, since the second bridge line 124 with the defect is electrically insulated from the second sensing series 120 after repairing, thus the first sensing series 110 and the second sensing series 120 are again electrically insulated. Therefore, the first sensing series 110 and the second sensing series 120 can provide a normal sensing operation. In other words, the touch panel 100 can provide a normal sensing operation.

In the touch panel 100 of the embodiment, the conductive repairing pattern layer 130 is, for example, overlapped with two adjacent first sensing pads 112 in the same first sensing series 110, and is overlapped with at least one of the two adjacent second sensing pads 122 in the same second sensing series 120. Thus, when the first bridge line 114 used to connect the two adjacent first sensing pads 112 and the second bridge line 124 used to connect the two adjacent second sensing pads 122 has a short defect or an open defect, the conductive repairing pattern layer 130 can be used as a substitute for the first bridge line 114 to connect the two adjacent first sensing pads 112, or be used as a substitute for the second bridge line 124 to connect the two adjacent second sensing pads 122. As such, after using the conductive repairing pattern layers 130 for repairing, the first sensing series 110 and the second sensing series 120 are again electrically insulated. Therefore, the first sensing series 110 and the second sensing series 120 can provide a normal sensing operation. Thus, the touch panel of the embodiment has a favorable yield and simple repairing method, so the waste of discarding touch panels is avoided, and further reduces the touch panel production cost.

On the other hand, since the touch panel of the embodiment has a favorable yield and simple repairing method, thus the touch panel of the embodiment is suitable for manufacturing an additive touch display panels and an integrated/in cell type touch display panels. Particularly, for an integrated/in-cell type touch display panel, the invention can resolve a short defect or an open defect in the crossover region of the sensing series resulting from electrostatic discharge. In other words, the manufacturing method of the touch panel of the embodiment can pair with current color filter substrate manufacturing processes, and at the same time substantially raise the yield of the touch panel.

The Second Embodiment

Figure 6A:
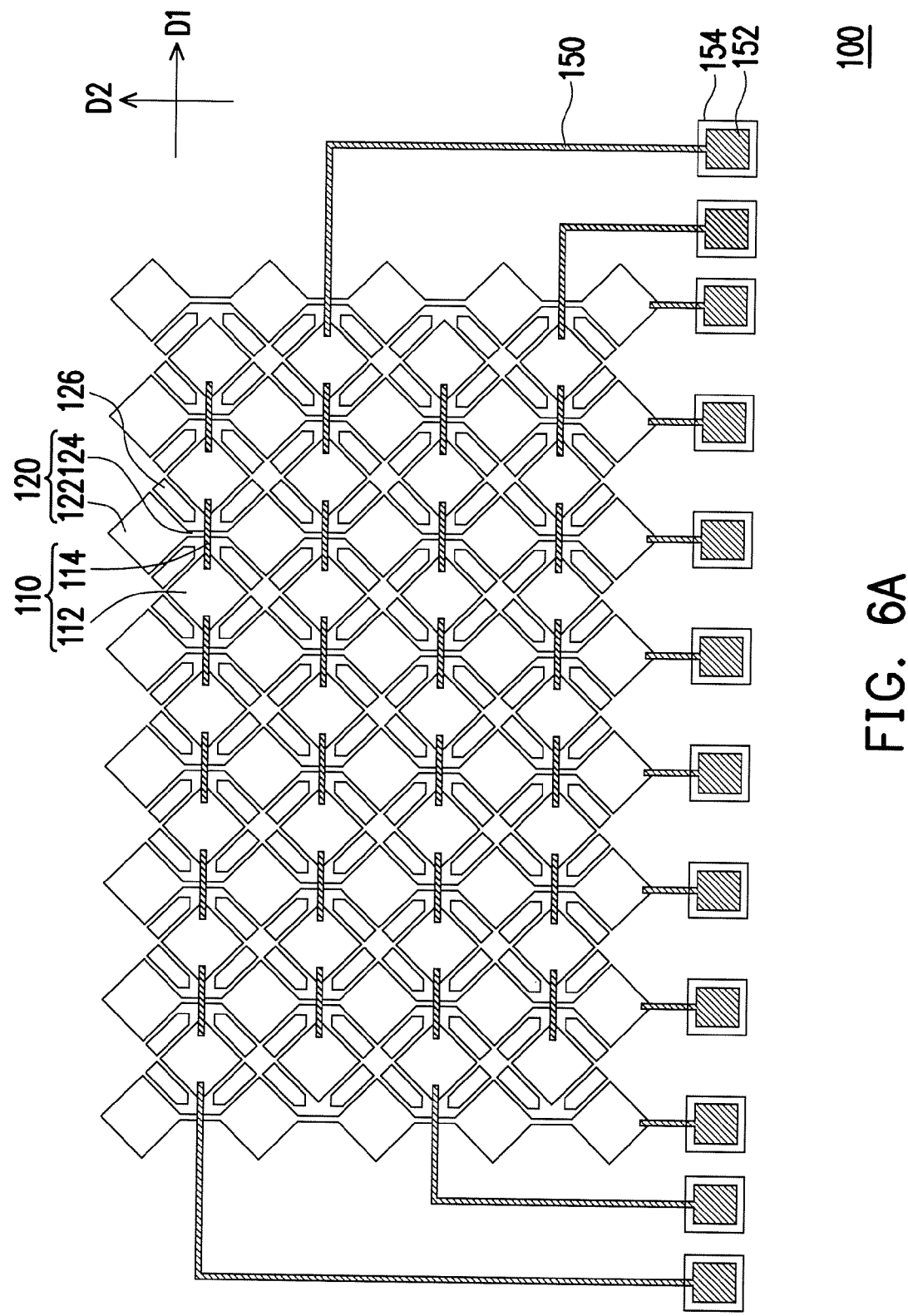
FIG. 6A is a schematic top view of a touch panel according to a second embodiment of the invention.
Figure 6B:
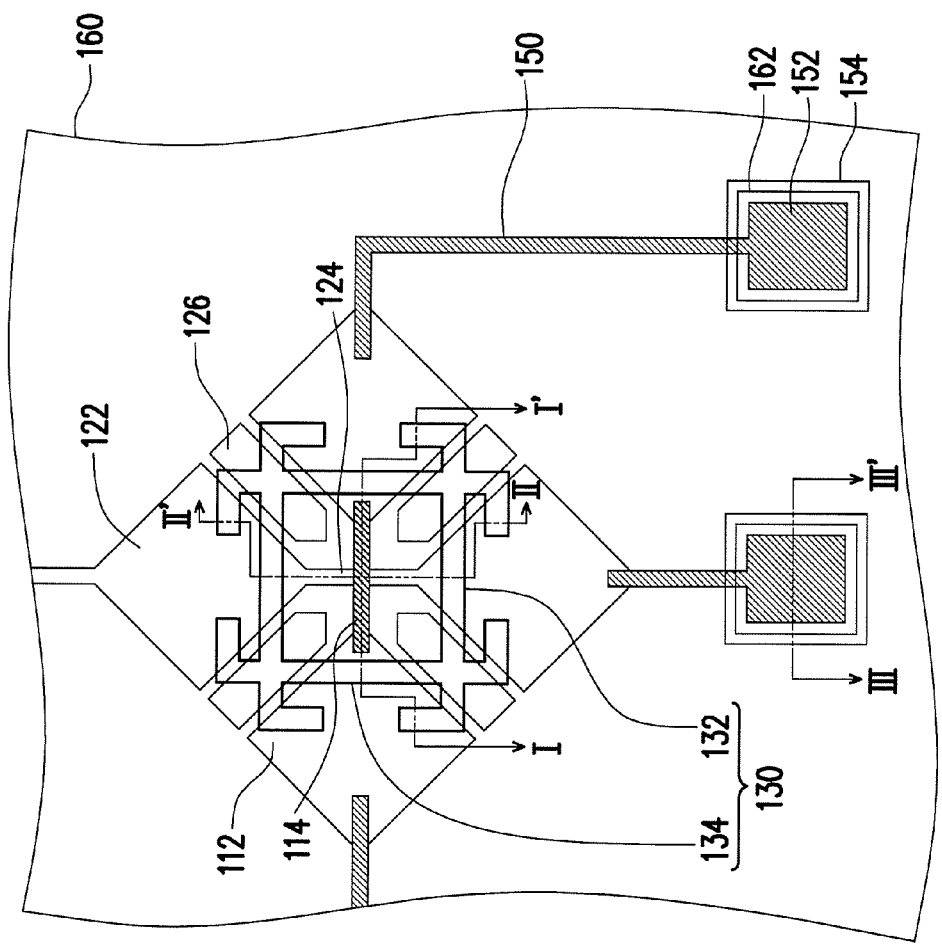
FIG. 6B is a partially enlarged schematic diagram of FIG. 6A.
Figure 6C:
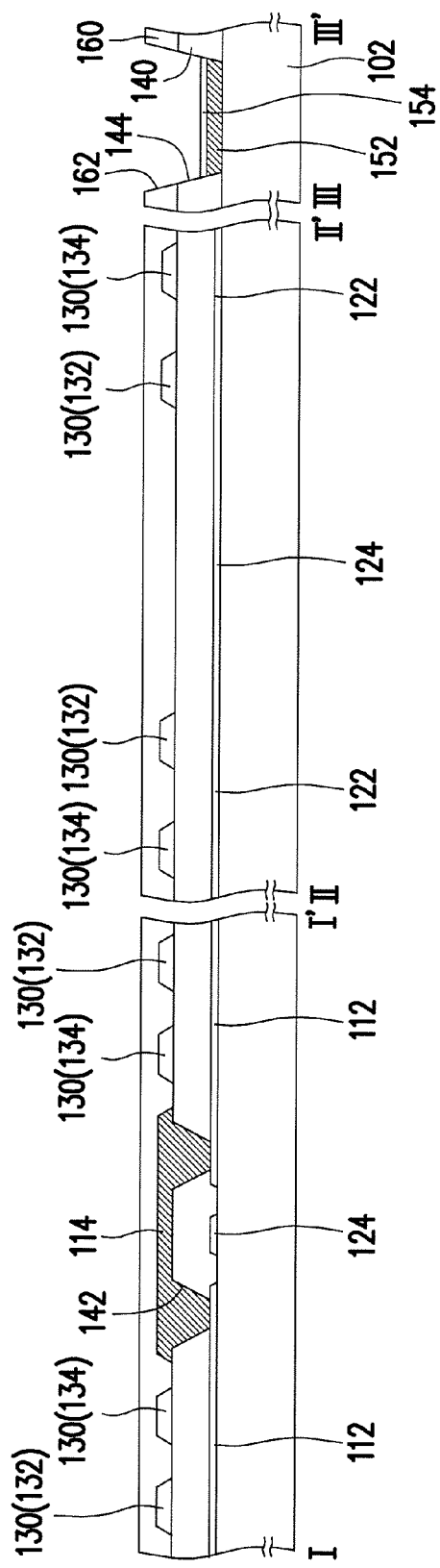
FIG. 6C is schematic cross-sectional views taken along a line I-I', a line II-II', and a line III-III' in FIG. 6B.

FIG. 6A is a schematic top view of a touch panel according to a second embodiment of the invention. FIG. 6B is a partially enlarged schematic diagram of FIG. 6A. FIG. 6C is schematic cross-sectional views taken along a line I-I', a line II-II', and a line III-III' in FIG. 6B. Please simultaneously refer to FIG. 6A to FIG. 6C. In the embodiment, the touch panel 100 includes a substrate 102, a plurality of first sensing series 110, a plurality of the second sensing series 120, a plurality of conductive repairing pattern layers 130, a first dielectric layer 140, a second dielectric layer 160, a plurality of peripheral connecting lines 150, and a plurality of peripheral connecting pads 152. In the embodiment, the first dielectric layer 140 is, for example, disposed on the substrate 102, and includes a plurality of contact windows 142.

In the embodiment, the first sensing series 110 are disposed on the substrate 102 and extended along a first direction D1. The first sensing series 110 includes a plurality of first sensing pads 112 and a plurality of first bridge lines 114. The first bridge lines 114 serially connect two adjacent first sensing pads 112. In the embodiment, the first sensing series 110 are, for example, disposed parallel to each other. The first direction D1 is, for example, an x-axis direction. The first sensing pads 112 are, for example, disposed on the substrate 102 and covered by the first dielectric layer 140, wherein the first sensing pads 112, for example, correspond to two contact windows 142. The first bridge lines 114 are, for example, disposed on the first dielectric layer 140, and the first bridge line 114 fills in the contact window 142, so that the first bridge lines 114 serially connect two adjacent first sensing pads 112 through the contact windows 142. In the embodiment, the first sensing pads 112 are, for example, made of a transparent conductive material, and the first bridge lines 114 are, for example, made of a metallic material.

The plurality of second sensing series 120 are disposed on the substrate 102 and extended along a second direction D2. Each of the second sensing series 120 includes a plurality of second sensing pads 122 and a plurality of second bridge lines 124. The second bridge lines 124 serially connect two adjacent second sensing pads 122. The first direction D1 is different from the second direction D2. In the embodiment, the second sensing series 120 are, for example, disposed parallel to each other. The second direction D2 is, for example, a y-axis direction, wherein the first direction D1 is, for example, perpendicular to the second direction D2. The second sensing pads 122 and the second bridge lines 124 are, for example, disposed on the substrate 102 and covered by the first dielectric layer 140. In the embodiment, the second sensing pads 122 and the second bridge lines 124 are, for example, made of the same conductive layer, wherein the material is, for example, a transparent conductive material.

In the embodiment, a crossover region of the first sensing series 110 and the second sensing series 120 is, for example, at the first bridge lines 114 and the second bridge lines 124. The first dielectric layer 140 is disposed between the first bridge lines 114 and the second bridge lines 124. Thus, the first sensing series 110 and the second sensing series 120 are electrically insulated from each other. In addition, the touch panel 100 further comprises a plurality of dummy electrodes 126, disposed between the first sensing pads 112 and the second sensing pads 122.

Please simultaneously refer to FIG. 6B and FIG. 6C. The conductive repairing pattern layer 130 is overlapped with the two adjacent first sensing pads 112 disposed in the same first sensing series 110, is overlapped with the two adjacent second sensing pads 122 disposed in the same second sensing series 120, or is overlapped with both of the above, and the conductive repairing pattern layers 130 are electrically floating. In the embodiment, the conductive repairing pattern layers 130 are, for example, disposed on the first dielectric layer 140.

In the embodiment, the conductive repairing pattern layer 130 is, for example, overlapped with two adjacent first sensing pads 112 in the same first sensing series 110, and is overlapped with two adjacent second sensing pads 122 in the same second sensing series 120. In other words, the conductive repairing pattern layer 130 is, for example, simultaneously overlapped with two adjacent first sensing pads 112 and two adjacent second sensing pads 122. The conductive repairing pattern layers 130, for example, include a plurality of first repairing lines 132 and a plurality of second repairing lines 134. The first repairing line 132 is overlapped with the corresponding two adjacent first sensing pads 112, and the second repairing line 134 is overlapped with the corresponding two adjacent second sensing pads 122. In the embodiment, the first repairing line 132 and the second repairing line 134 of the conductive repairing pattern layer 130 are, for example, substantially integrated as a whole, and made up of a mesh repairing pattern layer. The mesh repairing pattern layer is overlapped with the corresponding two adjacent first sensing pads 112, and is overlapped with the corresponding two adjacent second sensing pads 122. The conductive repairing pattern layers 130 and the first bridge lines 114 are, for example, made up of the same layer, with a material such as a transparent conductive material or a mesh metallic material.

It should be noted that although in the embodiment the conductive repairing pattern layers 130 simultaneously overlap with two adjacent first sensing pads 112 and two adjacent second sensing pads 122, and has a mesh structure, in an embodiment, the conductive repairing pattern layers 130 can also overlap with two adjacent first sensing pads 112 or two adjacent second sensing pads 122. For example, in an embodiment, the conductive repairing pattern layer 130 can comprise a first repairing line 132 or a plurality of first repairing lines 132, and the first repairing line 132 is overlapped with the corresponding two adjacent first sensing pads 112. In addition, even though the embodiment uses the conductive repairing pattern layer 130 shown in FIG. 6B, the conductive repairing pattern layer 130 can also have other structures; the invention is not limited thereto.

In the embodiment, the touch panel 100 further includes a second dielectric layer 160 disposed on the first dielectric layer 140 to cover the first sensing series 110 and the second sensing series 120. The first dielectric layer 140 and the second dielectric layer 160 exposes the peripheral connecting pads 152 through the contact windows 144, 162. The peripheral connecting lines 150 and the peripheral connecting pads 152 represent similar descriptions that can be referred to in the first embodiment, and thus are not reiterated herein.

Further provided is a manufacturing process of the touch panel of the invention, and FIG. 7A to FIG. 7D are schematic partial top views illustrating the manufacturing process of a touch panel in FIG. 6A. FIG. 8A to FIG. 8D are respectively schematic cross-sectional views taken along a line I-I', a line II-II', and a line III-III' in FIG. 7A to FIG. 7D. Please simultaneously refer to FIG. 7A and FIG. 8A. First, a plurality of first sensing pads 112, a plurality of second sensing pads 122, and a plurality of second bridge lines 124 are formed on a substrate 102. In the embodiment, the step further comprises forming a plurality of dummy electrodes 126 between the first sensing pads 112 and the second sensing pads 122. In the embodiment, the step, for example, includes the following. A transparent conductive material layer (not shown) is formed on the substrate 102, and the transparent conductive material layer is then patterned to form the first sensing pads 112, the second sensing pads 122, the second bridge lines 124, and the dummy electrodes 126. Next, a metallic material layer (not shown) is formed on the substrate 102, and the metallic material layer is then patterned to form the peripheral connecting lines 150 and the peripheral connecting pads 152. The second sensing pads 122 and the second bridge lines 124 electrically connected thereto form the second sensing series 120.

Figure 7A:
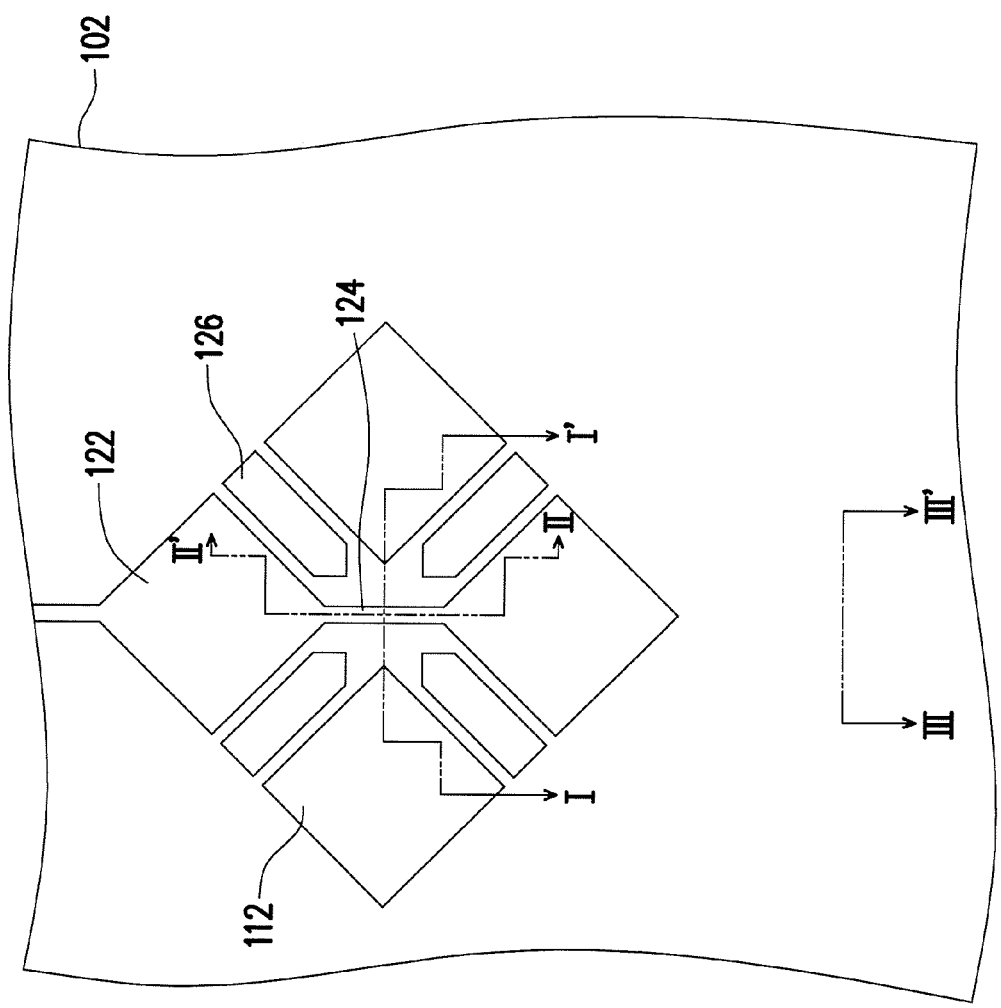
FIG. 7A to FIG. 7D are schematic top views illustrating the manufacturing process of a touch panel in FIG. 6A.
Figure 7B:
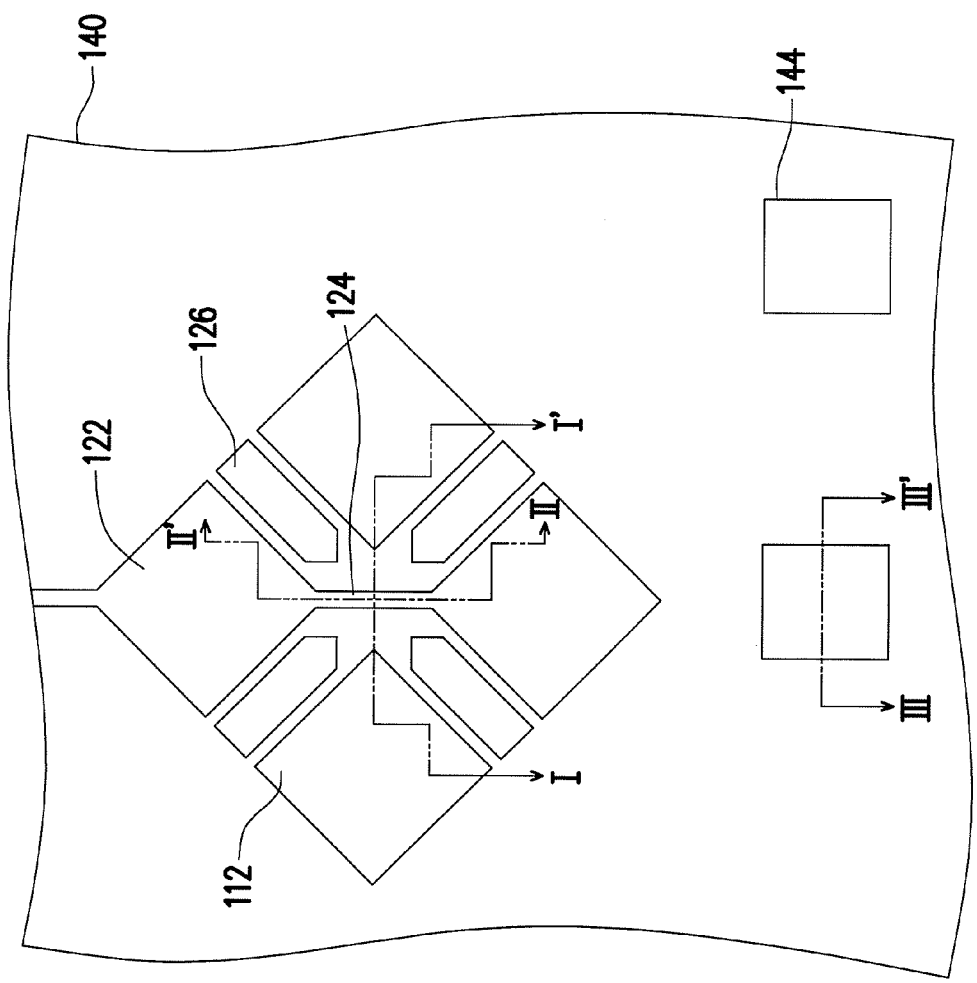
Figure 7C:
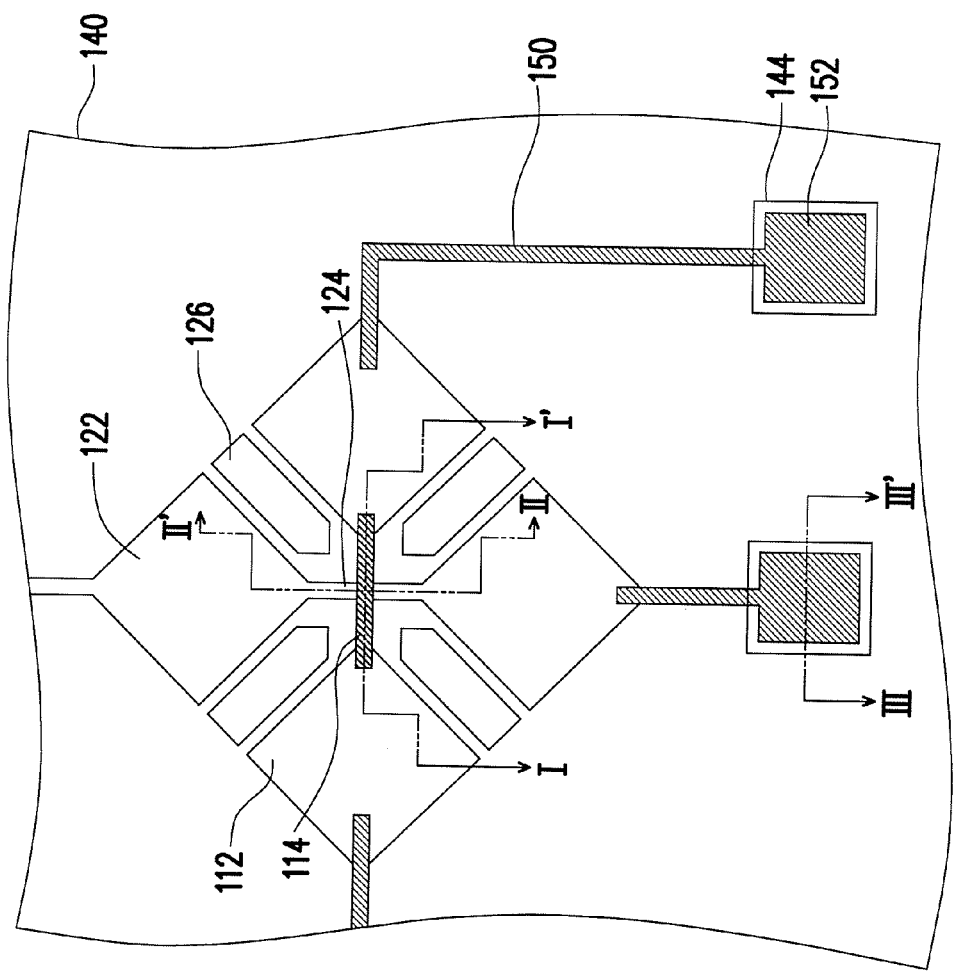
Figure 8A:
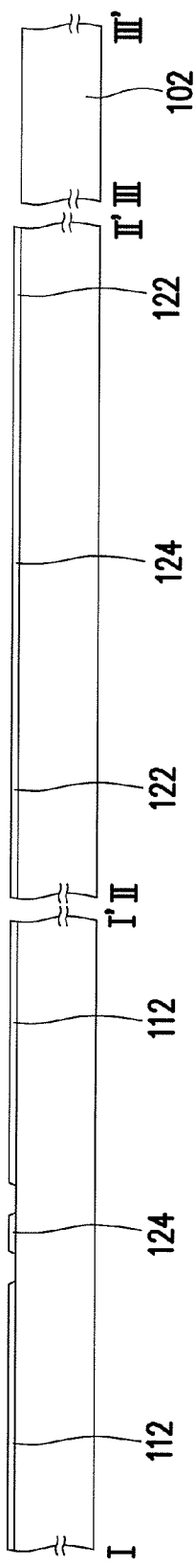
FIG. 8A to FIG. 8D are respectively schematic cross-sectional views taken along a line I-I', a line II-II', and a line in FIG. 7A to FIG. 7D.
Figure 8B:
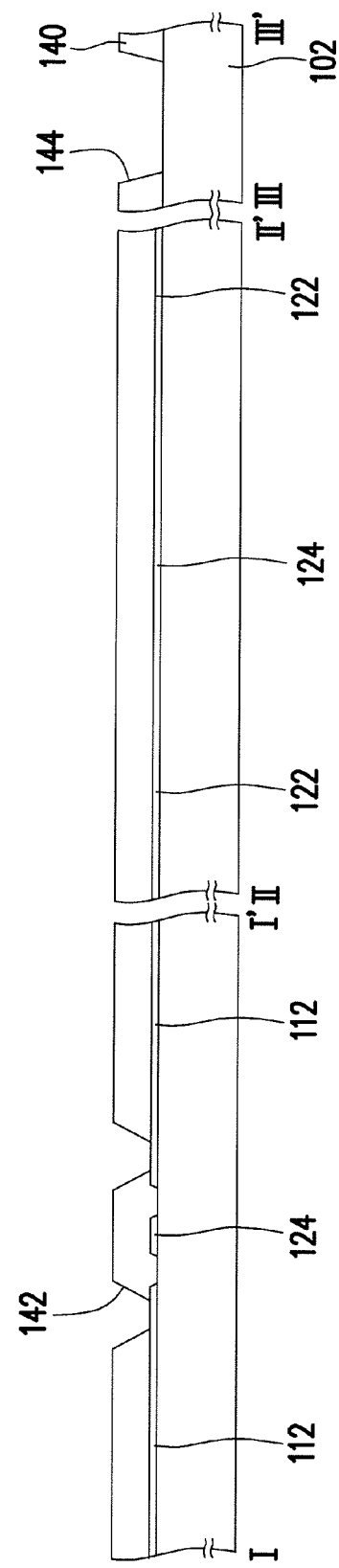
Figure 8C:
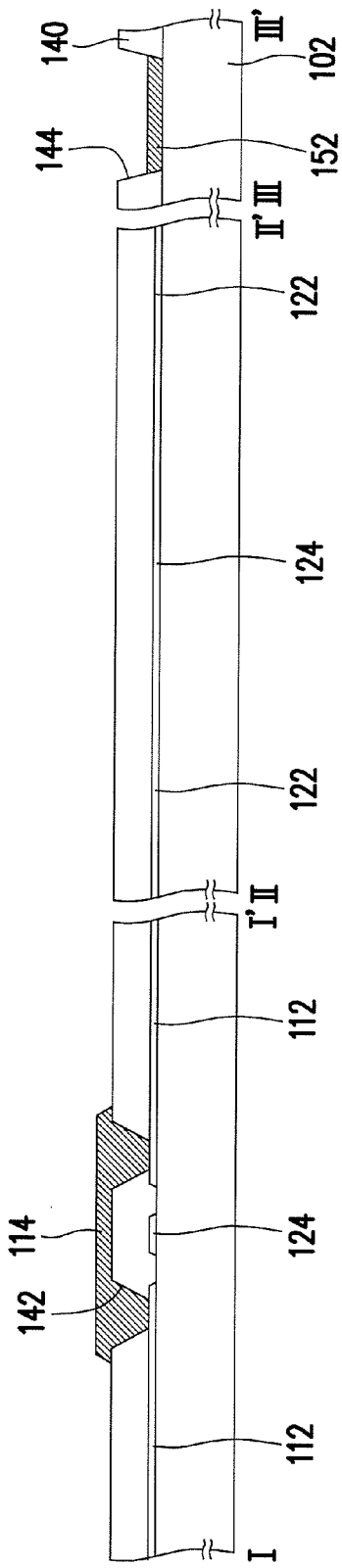

Please simultaneously refer to both FIG. 7B and FIG. 8B. Next, a first dielectric layer 140 is formed on the substrate 102 to cover the first sensing pads 112 and the second sensing series 120, wherein the first dielectric layer 140 has a plurality of contact windows 142. In the embodiment, the first dielectric layer 140 further covers the peripheral connecting lines 150, and exposes the peripheral connecting pads 152 through the contact window 144.

Please simultaneously refer to FIG. 7C and FIG. 7D, FIG. 8C and FIG. 8D. Next, a plurality of first bridge lines 114, a plurality of conductive repairing pattern layers 130, a plurality of peripheral connecting lines 150, and a plurality of peripheral connecting pads 152 are formed on the first dielectric layer 140, wherein the first bridge line 114 fills in the corresponding two contact windows 142, to connect the two adjacent first sensing pads 112. In the embodiment, the step is, for example, first forming a metallic material layer (not shown) on the first dielectric layer 140 and patterning the metallic material layer, so as to form the plurality of first bridge lines 114, the plurality of peripheral connecting lines 150, and the plurality of peripheral connecting pads 152 shown in FIG. 7C and FIG. 8C. Next, a transparent conductive material layer (not shown) is formed on the first dielectric layer 140 and patterned, to form the plurality of conductive repairing pattern layers 130 and the plurality of transparent conductive patterns 154 shown in FIG. 7D and FIG. 8D.

Figure 7D:
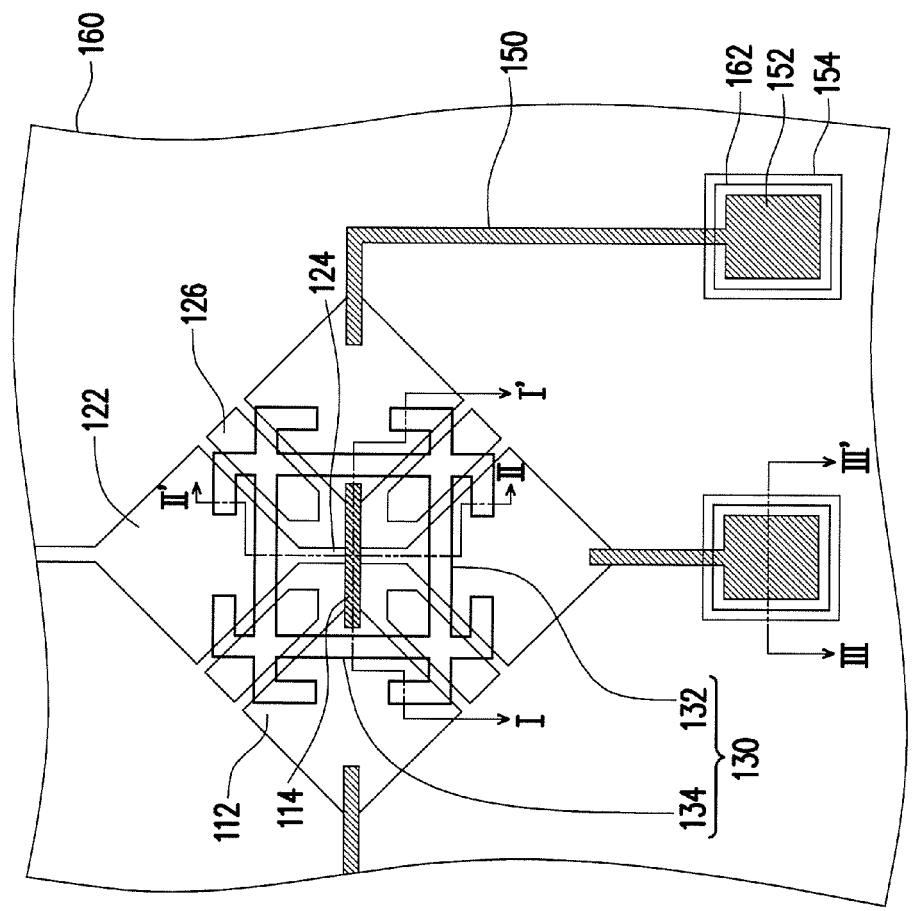
Figure 8D:
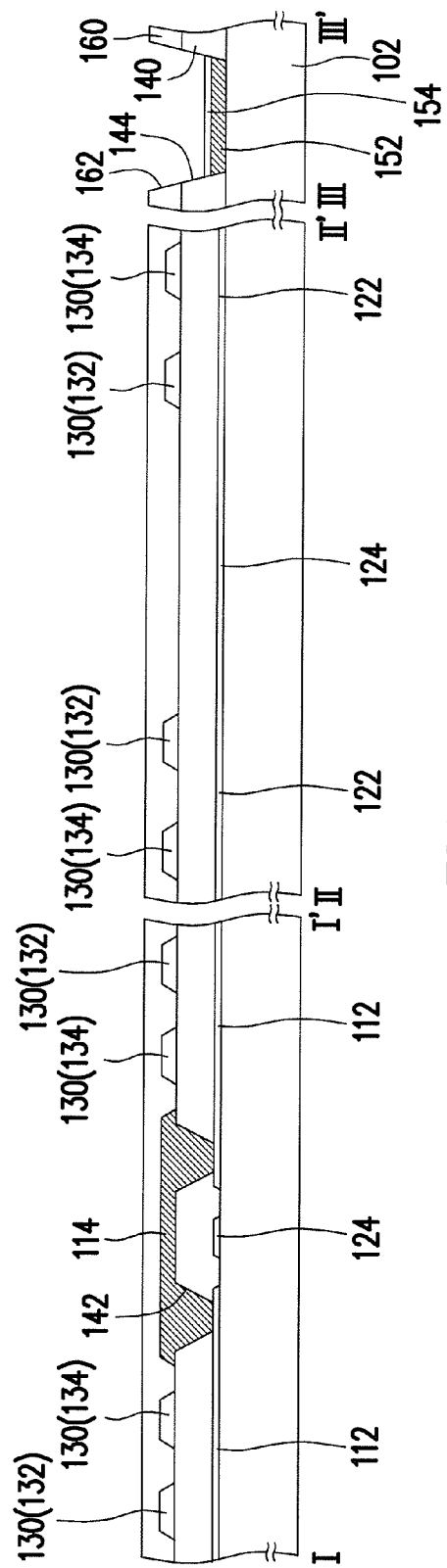

Please simultaneously refer to FIG. 7D and FIG. 8D. Subsequently, the second dielectric layer 160 is formed on the substrate 102, to cover the first sensing series 110 and the second sensing series 120, and the manufacture of the touch panel 100 is completed. In the embodiment, the second dielectric layer 160 exposes the transparent conductive pattern 154 on the peripheral connecting pads 152 through the contact windows 162.

Figure 9A:
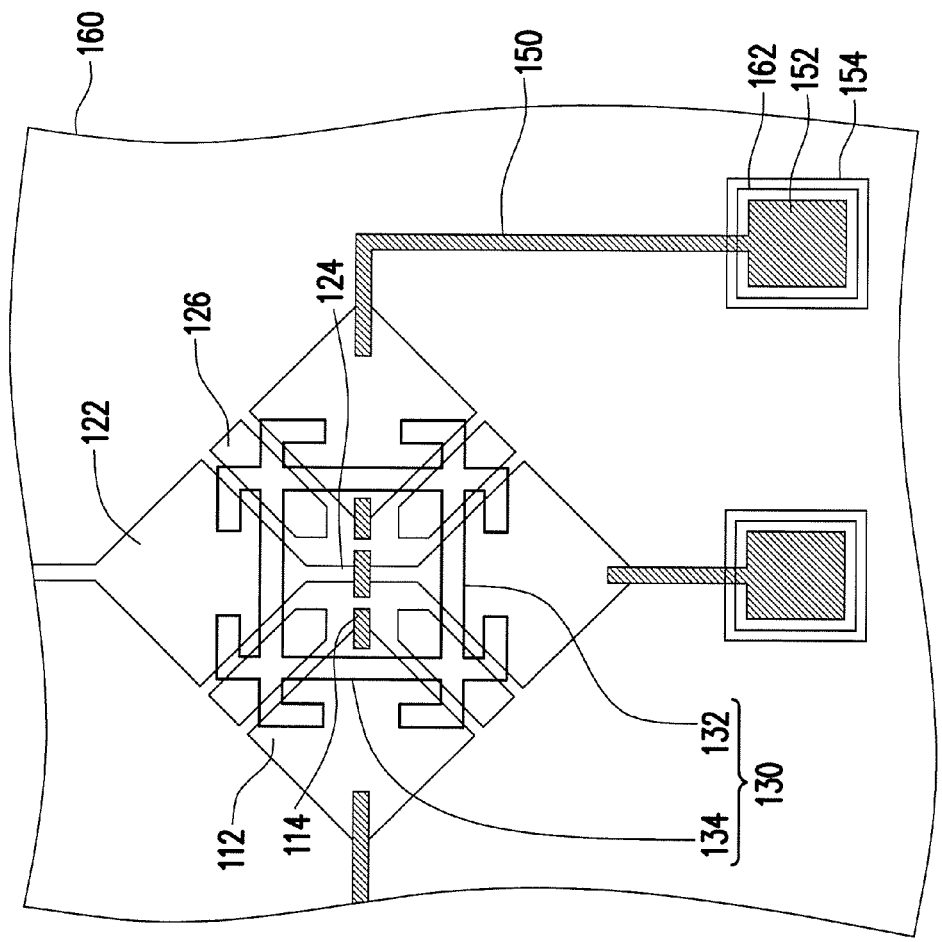
FIG. 9A and FIG. 9B depicts a repairing method of a touch panel according to an embodiment of the invention.
Figure 9B:
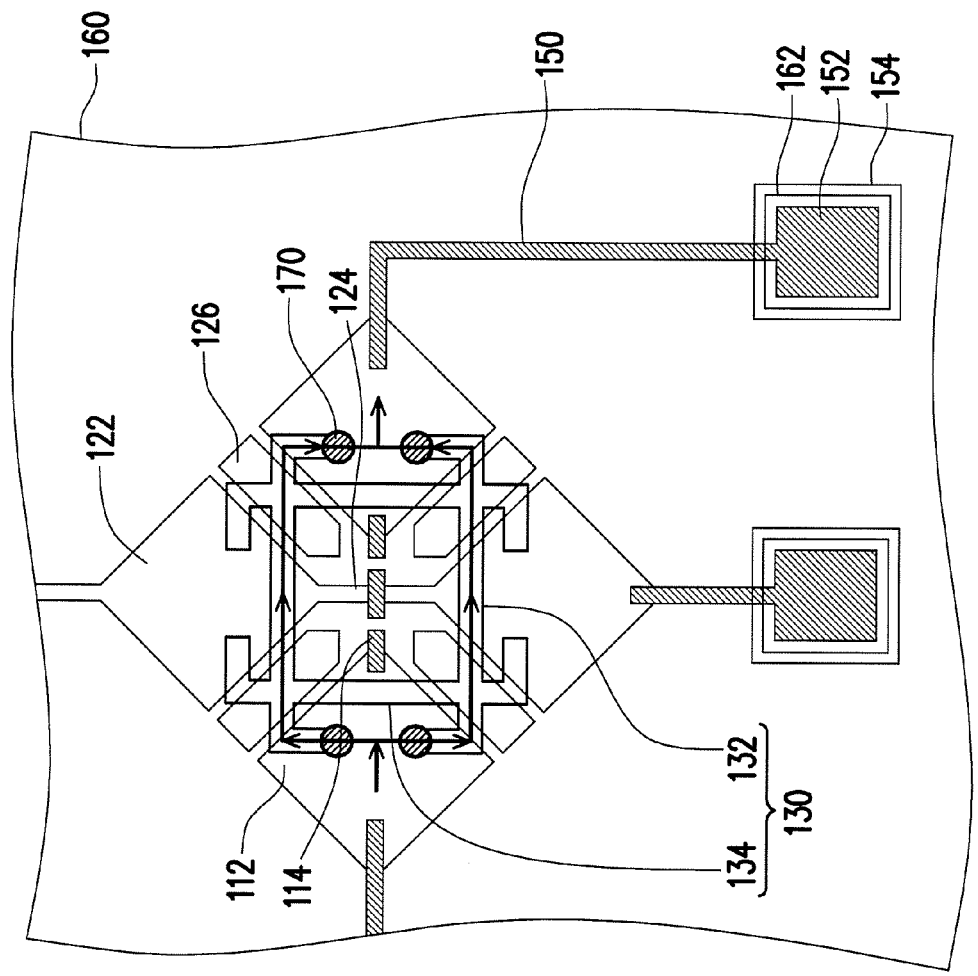

The invention provides a repairing method for repairing the aforementioned touch panel 100 when the crossover region of the first bridge line 114 of the first sensing series 110 and the second bridge line of the second sensing series 120 has a short defect or an open defect. FIG. 9A and FIG. 9B are schematic top views depicting a repairing method of the touch panel 100 in FIG. 6A when the crossover region of the first bridge line 114 and the second bridge line 124 has a short defect or an open defect. Please refer to FIG. 9A. First, the first bridge line 114 with the defect is cut, therefore two adjacent first sensing pads 112 originally connected through the first bridge line 114 are electrically insulated. The method of cutting the first bridge line 114 with the defect is, for example, using a laser cutting process, and the method of cutting the first bridge line 114 is, for example, cutting the connecting part between the first bridge line 114 and the first sensing pad 112. As such, the two adjacent first sensing pads 112 are electrically insulated.

Please refer to FIG. 9B. Next, the two adjacent first sensing pads 112 electrically insulated are electrically connected through the conductive repairing pattern layer 130 overlapped with the two adjacent first sensing pads 112. In the embodiment, a laser welding method, for instance, is used to weld the conductive repairing pattern layer 130 and the two adjacent first sensing pads 112, so a welding point 170 is formed where the conductive repairing pattern layer 130 is overlapped with two adjacent first sensing pads 112. In detail, for instance, the first repairing line 132 of the conductive repairing pattern layer 130 is welded with the two adjacent first sensing pads 112, so that the welding point 170 is formed where the first repairing line 132 is overlapped with the two adjacent first sensing pads 112. As such, the two adjacent first sensing pads 112 use the electrical connection between the welding point 170 and the conductive repairing pattern layers 130, so that the two adjacent first sensing pads 112 use the path in FIG. 9B to connect electrically. Therefore, the first sensing series 110 can provide a normal sensing operation. In addition, since the first bridge line 114 with the defect is electrically insulated from the first sensing series 110 after repairing, thus the first sensing series 110 and the second sensing series 120 are again electrically insulated. Therefore, the first sensing series 110 and the second sensing series 120 can provide a normal sensing operation. In other words, the touch panel 100 can provide a normal sensing operation.

On the other hand, when the crossover region of the first bridge line 114 of the first sensing series 110 and the second bridge line 124 of the second sensing series 120 has a short defect or an open defect, the repairing method may also have second bridge line 124 cut and may weld the conductive repairing pattern layers 130 with the two adjacent second sensing pads 122. Since this repairing method and the repairing method of cutting the first bridge line 114 is the same, the description is not reiterated herein.

In the touch panel 100 of the embodiment, the conductive repairing pattern layer 130 is, for example, overlapped with two adjacent first sensing pads 112 in the same first sensing series 110, and is overlapped with at least one of the two adjacent second sensing pads 122 in the same second sensing series 120. Thus, when the first bridge line 114 used to connect the two adjacent first sensing pads 112 and the second bridge line 124 used to connect the two adjacent second sensing pads 122 has a short defect or an open defect, the conductive repairing pattern layer 130 can be used as a substitute for the first bridge line 114 to connect the two adjacent first sensing pads 112, or be used as a substitute for the second bridge line 124 to connect the two adjacent second sensing pads 122. As such, after using the conductive repairing pattern layers 130 for repairing, the first sensing series 110 and the second sensing series 120 are again electrically insulated. Therefore, the first sensing series 110 and the second sensing series 120 can provide a normal sensing operation. Thus, the touch panel of the embodiment has a favorable yield and simple repairing method, so the waste of discarding touch panels is avoided, and further reduces the touch panel production cost.

On the other hand, since the touch panel of the embodiment has a favorable yield and simple repairing method, thus the touch panel of the embodiment is suitable for manufacturing an additive touch display panels and an integrated/in cell type touch display panels. Particularly, for an integrated/in-cell type touch display panel, the invention can resolve a short defect or an open defect in the crossover region of the sensing series resulting from electrostatic discharge. In other words, the manufacturing method of the touch panel of the embodiment can pair with current color filter substrate manufacturing processes, and at the same time substantially raise the yield rate of the touch panel.

Generally, in the touch panel and repairing method of the invention, each of the conductive repairing pattern layers is overlapped with two adjacent sensing pads in the same sensing series. As such, when the crossover region of the two sensing series has a short defect or an open defect, the conductive repairing pattern layers can be used to repair the defects, so the two sensing series can provide a normal sensing operation. As a result, the touch panel has a favorable yield and simple repair method. More particularly, since the touch panel of the invention is easily repaired, thus, it is especially suitable for manufactured integrated/in-cell type touch display panels, so as to solve the short defect or the open defect in the crossover region of the touch sensing series caused by the manufacture of color filter thin films. Thus, the manufacturing method of the touch panel of the invention can pair with current color filter substrate manufacturing processes, and at the same time substantially raise the yield of the touch panel.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:
1. A touch panel, comprising:
   a substrate;
   a plurality of first sensing series, disposed on the substrate and extended along a first direction, wherein each of the first sensing series includes a plurality of first sensing pads and a plurality of first bridge lines, wherein one of the first bridge lines is connected between two adjacent first sensing pads;
   a plurality of second sensing series, disposed on the substrate and extended along a second direction, wherein each of the second sensing series includes a plurality of second sensing pads and a plurality of second bridge lines, the first direction is different from the second direction, wherein one of the second bridge lines is connected between two adjacent second sensing pads, and the one of the first bridge lines is overlapped with the one of the second bridge lines along a third direction that is perpendicular to the first direction and the second direction;
   at least one repairing pattern layer overlapped with the two adjacent first sensing pads along the third direction, wherein:
   the at least one repairing pattern layer is not overlapped with the one of the first bridge lines and the one of the second bridge lines along the third direction; and the at least one repairing pattern layer includes:
      at least two first repairing lines spaced apart from each other; and
      at least two second repairing lines, wherein each of the at least two second repairing lines is connected with the at least two first repairing lines to form an enclosed aperture overlapped with an intersection of the one of the first bridge lines and the one of the second bridge lines.

2. The touch panel as claimed in claim 1, wherein the third direction is perpendicular to an interface between the substrate and the first bridge lines.

3. The touch panel as claimed in claim 1, further comprising a first dielectric layer, disposed on the substrate to cover the at least one repairing pattern layer, wherein the first dielectric layer includes a plurality of contact windows, and the first sensing pads and the second sensing pads are disposed on the first dielectric layer.

4. The touch panel as claimed in claim 3, wherein the first dielectric layer further covers the first bridge lines, the first sensing pads connect to the first bridge lines through the contact windows, and the second bridge lines are disposed on the first dielectric layer.

5. The touch panel as claimed in claim 3, further comprising a second dielectric layer, disposed on the first dielectric layer to cover the first sensing series and the second sensing series.

6. The touch panel as claimed in claim 1, further comprising a first dielectric layer, disposed on the substrate to cover the first sensing pads and the second sensing pads, wherein the first dielectric layer includes a plurality of contact windows, and the at least one repairing pattern layer is disposed on the first dielectric layer.

7. The touch panel as claimed in claim 6, wherein the first dielectric layer further covers the second bridge lines, the first bridge lines are disposed on the first dielectric layer, and the first sensing pads connect to the first bridge lines through the contact windows.

8. The touch panel as claimed in claim 1, wherein a material of the at least one repairing pattern layer comprises a transparent conductive material or a metallic conductive material.

9. The touch panel as claimed in claim 1, wherein the first bridge lines and the at least one repairing pattern layer are made of a same layer.

10. The touch panel as claimed in claim 1, wherein the at least one repairing pattern layer further overlaps with the two adjacent second sensing pads along the third direction.

11. The touch panel as claimed in claim 1, wherein a material of the first sensing pads, a material of the first bridge lines and a material of the second sensing pads are the same.

12. The touch panel as claimed in claim 1, wherein each of the first repairing lines is overlapped with the corresponding two adjacent first sensing pads.

13. The touch panel as claimed in claim 1, wherein each of the first repairing lines is overlapped with the two adjacent first sensing pads, each of the second repairing lines is overlapped with the two adjacent second sensing pads.

14. The touch panel as claimed in claim 1, further comprising a plurality of dummy electrodes, disposed between the first sensing pads and the second sensing pads.

15. The touch panel as claimed in claim 1, further comprising a plurality of peripheral connecting lines, electrically connected to corresponding first sensing series and corresponding second sensing series respectively.

16. The touch panel as claimed in claim 1, wherein the at least one repairing pattern layer is electrically floating.

17. A repairing method for repairing a touch panel, suitable to repair the touch panel as claimed in claim 1 when a defect occurs in a crossover region of the one of the first bridge line and the one of the second bridge line of the touch panel, the repairing method comprising:
cutting the one of the first bridge line with the defect, therefore the two adjacent first sensing pads originally connected through the one of the first bridge line are to be electrically insulated; and
electrically connecting the two adjacent first sensing pads through the at least one repairing pattern layer overlapped with the two adjacent first sensing pads.

18. The touch panel repair method as claimed in claim 17, wherein a method of cutting the one of the first bridge line with the defect comprises a laser cutting process, and wherein a method of electrically connecting the two adjacent first sensing pads through the at least one repairing pattern layer overlapped with the two adjacent first sensing pads comprises welding the at least one repairing pattern layer with the two adjacent first sensing pads.

19. The touch panel repair method as claimed in claim 17, wherein the step of cutting the one of the first bridge line with the defect is before the step of electrically connecting the two adjacent first sensing pads through the at least one repairing pattern layer overlapped with the two adjacent first sensing pads.

20. A touch panel, comprising:
a substrate;
a plurality of first sensing series, disposed on the substrate and extended along a first direction, wherein each of the first sensing series includes a plurality of first sensing pads and a plurality of first bridge lines, wherein one of the first bridge lines is connected between two adjacent first sensing pads;
a plurality of second sensing series, disposed on the substrate and extended along a second direction, wherein each of the second sensing series includes a plurality of second sensing pads and a plurality of second bridge lines, the first direction is different from the second direction, wherein one of the second bridge lines is connected between two adjacent second sensing pads, and the one of the first bridge lines is overlapped with the one of the second bridge lines along a third direction that is perpendicular to the first direction and the second direction;
at least one repairing pattern layer, which is constituted by a single and continuous structure, simultaneously overlapped with the two adjacent first sensing pads and two adjacent second sensing pads along the third direction, wherein the two adjacent first sensing pads are near the two adjacent second sensing pads, and the at least one repairing pattern layer includes:
at least two first repairing lines spaced apart from each other; and
at least two second repairing lines, wherein each of the at least two second repairing lines is connected with the at least two first repairing lines to form an enclosed aperture overlapped with an intersection of the one of the first bridge lines and the one of the second bridge lines.

* * * * *